United States Patent
He et al.

(10) Patent No.: US 10,944,521 B2
(45) Date of Patent: Mar. 9, 2021

(54) DATA SENDING METHOD, RELATED DEVICE, AND SYSTEM

(71) Applicant: Huawei Technologies Co., Ltd., Shenzhen (CN)

(72) Inventors: Chuanfeng He, Shenzhen (CN); Bingyu Qu, Beijing (CN); Jianqin Liu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/588,077

(22) Filed: Sep. 30, 2019

(65) Prior Publication Data
US 2020/0028642 A1 Jan. 23, 2020

Related U.S. Application Data

(63) Continuation of application No. PCT/CN2018/080071, filed on Mar. 22, 2018.

(30) Foreign Application Priority Data

Mar. 30, 2017 (CN) .......... 201710204041.6

(51) Int. Cl.
*H04L 5/00* (2006.01)
*H04W 72/04* (2009.01)
*H04W 72/08* (2009.01)

(52) U.S. Cl.
CPC .......... *H04L 5/0007* (2013.01); *H04L 5/0048* (2013.01); *H04W 72/044* (2013.01); *H04W 72/085* (2013.01); *H04L 5/0057* (2013.01)

(58) Field of Classification Search
CPC ... H04L 5/0007; H04L 5/0048; H04L 5/0057; H04L 5/0044; H04L 5/0073;
(Continued)

(56) References Cited

U.S. PATENT DOCUMENTS

2015/0078222 A1 3/2015 Yang et al.
2015/0110086 A1* 4/2015 Li .......................... H04J 11/005
370/336
(Continued)

FOREIGN PATENT DOCUMENTS

CN 102065557 A 5/2011
CN 103069739 A 4/2013
(Continued)

OTHER PUBLICATIONS

"SRS transmission on PUSCH resources," 3GPP TSG RAN WG1 Meeting #81, Fukuoka, Japan, R1-152487, pp. 1-6, 3rd Generation Partnership Project, Valbonne, France (May 25-29, 2015).
(Continued)

*Primary Examiner* — Afshawn M Towfighi
(74) *Attorney, Agent, or Firm* — Leydig, Voit & Mayer, Ltd.

(57) ABSTRACT

A data sending method, a related device, and a system are described. The method includes sending, by a network device, resource location information of a first reference signal and a physical channel to a terminal, where a first time-frequency resource on which the first reference signal is mapped overlaps a second time-frequency resource corresponding to the physical channel. An overlapping resource is not used to transmit the physical channel, and a third time-frequency resource in the second time-frequency resource other than the overlapping resource is used to transmit the physical channel. Alternatively, an overlapping resource is used to send a second reference signal; or an overlapping region is used to send a second reference signal, where the terminal skips sending the first reference signal, and the second reference signal is orthogonal to the first reference signal.

17 Claims, 16 Drawing Sheets

(58) Field of Classification Search
CPC .............. H04L 5/0075; H04W 72/044; H04W 72/085; H04W 72/04; H04W 72/12
See application file for complete search history.

(56) References Cited

U.S. PATENT DOCUMENTS

| | | | |
|---|---|---|---|
| 2015/0282140 A1* | 10/2015 | Ezaki | H04W 24/08 370/330 |
| 2016/0057708 A1* | 2/2016 | Siomina | H04W 72/1263 455/452.2 |
| 2017/0353931 A1* | 12/2017 | Stern-Berkowitz | H04L 27/2613 |
| 2017/0374675 A1 | 12/2017 | Hwang et al. | |
| 2018/0191483 A1* | 7/2018 | Yamazaki | H04L 5/0051 |

FOREIGN PATENT DOCUMENTS

| | | |
|---|---|---|
| CN | 105103631 A | 11/2015 |
| CN | 104813724 B | 4/2019 |
| WO | 2016099135 A1 | 6/2016 |

OTHER PUBLICATIONS

"NB-PUSCH design," 3GPP TSG RAN1 meeting #84, St Julian's, Malta, R1-160454, total 5 pages, 3rd Generation Partnership Project, Valbonne, France (Feb. 15-19, 2016).

\* cited by examiner

DATA SENDING METHOD, RELATED DEVICE, AND SYSTEM

CROSS-REFERENCE TO RELATED APPLICATIONS

This application is a continuation of International Application No. PCT/CN2018/080071, filed on Mar. 22, 2018, which claims priority to Chinese Patent Application No. 201710204041.6, filed on Mar. 30, 2017. The disclosures of the aforementioned applications are hereby incorporated by reference in their entireties.

TECHNICAL FIELD

The present invention relates to the field of communications technologies, and in particular, to a data sending method, a related device, and a system.

BACKGROUND

An uplink physical channel in a third generation partnership project (3GPP) long term evolution (LTE) system includes a physical random access channel (PRACH), a physical uplink shared channel (PUSCH), and a physical uplink control channel (PUCCH). In addition, there are two types of physical uplink reference signals. One type is a demodulation reference signal (DMRS) used to demodulate data/control signaling, and the other type is a sounding reference signal (SRS) used to measure an uplink channel.

A base station performs sounding on uplink channels of user equipment (UE) that are at different frequency bands by using the SRS, estimates quality of the uplink channels at different frequency bands, and allocates, based on a sounding result of the uplink channel quality, resource blocks (RB) of channels in a good state to the UE for PUSCH transmission. In addition, the base station may select different transmission parameters (such as an instantaneous data rate). In addition, in an LTE time division duplexing (TDD) system, a same carrier frequency and different time are used for sending and receiving in an uplink and a downlink. Therefore, the UE may send an SRS in the uplink, so that the base station side performs sounding on a channel between the base station and the UE by using the received SRS. Because the carrier frequency of the uplink is the same as that of the downlink, information about a downlink channel may be obtained based on a sounding result of an uplink channel by using channel reciprocity.

To maintain a single carrier characteristic of an uplink signal and avoid interference between SRSs and PUSCHs/PUCCHs of different users, related LTE configurations are specified as follows:

(1) When the UE needs to simultaneously send a PUSCH and an SRS in a subframe, the PUSCH is not sent on the last symbol of the corresponding subframe, and the SRS is sent on the last symbol of the subframe.

(2) When the UE needs to send only a PUSCH in a subframe, if the subframe is a higher-layer configured cell-specific subframe that can be used to send an SRS, when resource allocation of the PUSCH overlaps bandwidth configuration of a higher-layer configured cell-specific SRS, the PUSCH is not sent on the last symbol of the subframe; otherwise, the PUSCH is sent on the last symbol of the subframe.

In current LTE specifications, as long as the last symbol of an uplink transmission subframe is to be used to send an SRS (regardless of a wideband SRS or a narrowband SRS), the entire symbol cannot be used for PUSCH transmission of all UEs in a cell. That is, an SRS and a PUSCH cannot be multiplexed on a time-frequency resource corresponding to the symbol occupied by the SRS.

As an LTE technology evolves and an Internet of things technology develops, in current 4G and future 5G, a quantity of UEs in a cell needs to continuously increase, and a quantity of active subscribers in a network gradually increases. Because a quantity of uplink subframes in an uplink-downlink subframe configuration usually configured in the LTE (especially in the TDD system) is relatively small, an SRS capacity is relatively limited, and is difficult to meet a multi-user (MU) requirement. To support channel sounding of more active subscribers, the SRS capacity needs to be further expanded. In the prior art, in the LTE-advanced Rel-13, several SRS capacity enhancement technologies are introduced. For example, a repetition factor (RPF) of an SRS is increased from 2 to 4, and additional two or four symbols may be configured in an uplink pilot timeslot (UpPTS) in an uplink subframe for sending the SRS. Other solutions include sending an SRS on a time-frequency resource of a PUSCH, to enhance the SRS capacity. However, a notable disadvantage of the foregoing capacity enhancement technologies is that, in current LTE, when an SRS is sent on a time-frequency resource of a PUSCH, the time-frequency resource cannot be used to send the PUSCH. Therefore, an uplink data throughput is affected.

SUMMARY

Embodiments of the present invention provide a data sending method, a related device, and a system, to multiplex a PUSCH and an SRS in a time-frequency resource of uplink transmission, and reduce impact of SRS capacity expansion on an uplink data throughput.

According to a first aspect, an embodiment of the present invention provides a data sending method. Described from a terminal side, the method includes: receiving, by a terminal, resource location information that is sent by a network device and that is of a first reference signal and a physical channel, where the first reference signal is mapped on a first time-frequency resource, the first time-frequency resource partially or totally overlaps a second time-frequency resource corresponding to the physical channel, and a time-frequency resource corresponding to a part that is in the second time-frequency resource and that overlaps the first time-frequency resource is an overlapping resource; the overlapping resource is not used to transmit the physical channel, and a third time-frequency resource in the second time-frequency resource other than the overlapping resource is used to transmit the physical channel; and the terminal sends the physical channel to the network device on the third time-frequency resource; or the overlapping resource is used to send a second reference signal, and a third time-frequency resource in the second time-frequency resource other than the overlapping resource is used to transmit the physical channel; and the terminal sends the second reference signal on the overlapping resource, and sends the physical channel on the third time-frequency resource; or a second time-frequency resource corresponding to a symbol in which the overlapping resource is located is an overlapping region, the overlapping region is used to send a second reference signal, and a fourth time-frequency resource in the second time-frequency resource other than the overlapping region is used to transmit the physical channel; the terminal sends the second reference signal in the overlapping region, and sends the physical channel on the fourth time-frequency resource;

and the symbol is a discrete Fourier transform-spread orthogonal frequency division multiplexing (DFT-S-OFDM) symbol, an orthogonal frequency division multiplexing (OFDM) symbol, or a cyclic prefix orthogonal frequency division multiplexing (CP-OFDM) symbol; the first reference signal is used to sound uplink channel quality, the first reference signal may be carried in any symbol in a subframe, and the first reference signal may be carried in one symbol in the subframe or may be carried in a plurality of symbols in the subframe; the second reference signal is orthogonal to the first reference signal; and the first reference signal is an SRS of the terminal or an SRS of another terminal, and when the first reference signal is an SRS of another terminal, the terminal skips sending the first reference signal.

It can be learned that, in this embodiment of the present invention, the first reference signal (SRS) may be sent in any symbol in a subframe. When the terminal sends the physical channel, if a time-frequency resource of the physical channel in the current subframe overlaps a time-frequency resource of the SRS, the terminal may multiplex the physical channel and the reference signal in one symbol, or may multiplex the physical channel and the reference signal in one time-frequency resource (including one RB or a plurality of RBs). In addition, a plurality of SRSs may be mapped in one subframe. In the subframe, uplink data and the SRS may be simultaneously sent, which helps improve a sending speed of the SRS, increase a capacity for SRSs in one subframe, and ensure stability of an uplink data throughput during communication transmission. In addition, the terminal may further send the reference signal of the terminal by using the overlapping resource or the overlapping region. This helps improve the transmission efficiency of the terminal, improve utilization of the time-frequency resource, and avoid waste of the overlapping resource or the overlapping region.

With reference to the first aspect, in some possible implementations, the physical channel is an uplink data bearer channel, and the physical channel is used to carry uplink data. In a specific embodiment, the physical channel is a PUSCH or a PUCCH.

With reference to the first aspect, in some possible implementations, when a bandwidth of the overlapping resource is narrower than a bandwidth of the physical channel, the terminal sets different power offsets for a physical channel of the symbol in which the overlapping resource is located and a physical channel of a remaining symbol, and the remaining symbol is a symbol in symbols corresponding to the second time-frequency resource other than the symbol in which the overlapping resource is located. That is, the terminal sets different power offsets for the symbol in which the overlapping resource is located and a symbol in which the fourth time-frequency resource is located.

In a specific embodiment, the time-frequency resource of the physical channel overlaps the time-frequency resource of the first reference signal. When the bandwidth of the physical channel is wider than the bandwidth of the overlapping resource, because the overlapping resource is not used to send the PUSCH, uplink data carried in the symbol in which the overlapping resource is located decreases. As a result, a transmit power of the symbol is lower than a transmit power of another symbol in the subframe. To avoid that transmit powers of the terminal in different symbols in the subframe are unbalanced, in this case, the terminal may set different power offsets (power offset) for the transmit power of the symbol and the transmit power of the another symbol, and perform power boosting on uplink data carried in a part in the overlapping region other than the overlapping resource in the symbol. In this way, the symbol has the transmit power equivalent to the transmit power of the another symbol, so that the terminal balances a power spectral density in an uplink transmission process.

With reference to the first aspect, in some possible implementations, the second reference signal is used to sound uplink channel quality of the terminal. Specifically, the second reference signal is an SRS of the terminal.

In a specific embodiment, the physical channel is a PUSCH, the first reference signal is an SRS generated by another terminal in a cell, and the second reference signal is an SRS generated by the terminal, and is referred to as a block SRS. That is, the block SRS is used to sound the uplink channel quality of the terminal. The block SRS is orthogonal to the SRS. When a bandwidth of the PUSCH is narrower than or equal to a bandwidth of the SRS, and the bandwidth of the PUSCH is equal to the bandwidth of the overlapping resource, the terminal may send the block SRS on the overlapping resource. When the bandwidth of the PUSCH is wider than the bandwidth of the overlapping resource, the terminal may send the block SRS in the overlapping region. It can be learned that, implementation of this embodiment helps improve the transmission efficiency of the SRS of the terminal, improve utilization of the time-frequency resource, avoid waste of the overlapping resource or the overlapping region, and avoid a case in which the symbol does not carry any data.

With reference to the first aspect, in some possible implementations, the second reference signal is used to demodulate a signal of the terminal, and the second reference signal is preset at a preset location in the second time-frequency resource. A time-frequency resource corresponding to the preset location in the second time-frequency resource is used to transmit the physical channel. Specifically, the second reference signal is a DMRS of the terminal.

In a specific embodiment, the physical channel is a PUSCH, the first reference signal is an SRS generated by another terminal in a cell, and the second reference signal is a DMRS generated by the terminal. The DMRS is used to demodulate a signal of the terminal, the DMRS is transmitted together with the PUSCH, and a bandwidth of the DMRS is the same as a bandwidth of the PUSCH. In this embodiment, when the time-frequency resource of the PUSCH overlaps the time-frequency resource of the SRS, the terminal changes the DMRS originally supposed to be carried on the preset location of the PUSCH to be carried in the overlapping region, and the DMRS remains orthogonal to the SRS. In a further implementation, after it is determined that the overlapping region is used to carry the DMRS, the terminal changes the preset location originally supposed to carry the DMRS to be used to carry uplink data. It can be learned that, in this embodiment, because a total quantity of time-frequency resources allocated to the uplink data remains unchanged, and the time-frequency resource used by the terminal to transmit the PUSCH of the uplink data remains stable, negative impact that may be caused to uplink transmission of the terminal is avoided.

With reference to the first aspect, in some possible implementations, overlapping parts between the second reference signal and the first reference signal implement orthogonality through cyclic shift, and a time-frequency resource corresponding to the overlapping part is the overlapping resource.

Specifically, the terminal may implement orthogonality between the second reference signal and the first reference signal in a plurality of manners. For example, when the second reference signal and the first reference signal have a same bandwidth and totally overlap in frequency domain, the terminal may implement orthogonality between the second reference signal and the first reference signal in an overall cyclic shift manner; and when the second reference signal and the first reference signal do not have a same bandwidth or do not overlap in frequency domain, the terminal may implement orthogonality between the second reference signal and the first reference signal in a frequency domain comb manner, an orthogonal cover code (OCC) manner, a block orthogonal manner, or the like. In this embodiment of the present invention, the block orthogonality means that a frequency domain bandwidth of a reference signal is divided into blocks, each block includes a fixed quantity of frequency domain bandwidths (that is, a reference signal sequence on each block has a corresponding length), and the terminal determines a corresponding block based on the bandwidth of the overlapping resource or the overlapping region, and performs cyclic shift on different reference signals in the block of the overlapping resource or the overlapping region, to enable reference signal sequences in the block of the overlapping resource or the overlapping region to be orthogonal, so that the second reference signal and the first reference signal that do not have a same bandwidth or do not overlap in frequency domain are orthogonal. In a specific implementation, block orthogonality may be implemented by using a sequence code division orthogonal block wise technology.

It can be learned that, during implementation of this embodiment of the present invention, regardless of whether the bandwidth and the frequency domain of the second reference signal are consistent with that of the first reference signal, orthogonality between the second reference signal and the first reference signal may be implemented.

With reference to the first aspect, in some possible implementations, when the first reference signal is generated by the terminal, the first reference signal is used to sound uplink channel quality of the terminal. The terminal sends the first reference signal to the network device on the first time-frequency resource.

In a specific embodiment of the present invention, when the first reference signal is generated by another terminal, after the terminal determines a multiplexing mode of the physical channel and the first reference signal based on the resource location information, the terminal sends uplink data, the DMRS, and the SRS (if such exists) that are carried in the second time-frequency resource to the network device based on the specific multiplexing mode.

When the first reference signal is generated by the terminal, the terminal directly sends the first reference signal to the network device on the first time-frequency resource, and sends uplink data to the network device on a time-frequency resource of the physical channel in the second time-frequency resource other than the overlapping resource or the overlapping region.

With reference to the first aspect, in some possible implementations, the resource location information is indicated by the network device by using radio resource control (RRC) layer signaling or physical layer signaling.

In a specific embodiment, the network device may send the resource location information to the terminal in a dynamic manner by using physical layer signaling. For example, the resource location information is indicated by using uplink scheduling grant (UL grant) signaling, and the network device schedules the terminal to send a PUSCH by using the UL grant. Specifically, the terminal determines, based on the UL grant, a format for sending the uplink PUSCH, including resource allocation and a transmission format. The resource allocation includes RB allocation and the like, and the transmission format includes a modulation scheme and the like. UE sends, based on the UL grant, the PUSCH in the indicated transmission format on an allocated time-frequency resource. Specifically, the uplink scheduling grant signaling may be sent to the scheduled terminal through a Physical Downlink Control Channel (PDCCH) in a downlink control information (DCI) format 0. The DCI format 0 may be used to dynamically trigger the UE to perform aperiodic channel state information (CSI) reporting, and the uplink scheduling grant signaling is referred to as a channel quality indicator (CQI) request. The CQI request may be used to trigger the terminal to feed back an aperiodic CSI report.

In another specific embodiment, the network device may send the resource location information to the terminal in a semi-persistent manner by using higher layer signaling. The resource location information is indicated by using RRC layer signaling. During semi-persistent scheduling by using RRC layer signaling, the RRC layer signaling specifies a semi-persistent scheduling period, and the network device only needs to allocate or specify configuration information once to the terminal through the PDCCH, and the terminal can periodically and repeatedly use a same PUSCH time-frequency resource within the scheduling period. For example, the RRC layer signaling includes a sending period and a subframe offset of the SRS, and a bandwidth, a frequency domain start location, a comb, and a cyclic shift of the SRS. The terminal may generate a corresponding SRS based on the resource location information and the overlapping resource, to add the SRS to the overlapping resource.

Certainly, in this embodiment of the present invention, the resource location information may be implemented in various manners. For example, the resource location information may alternatively be indicated by using media access control (MAC) layer signaling (MAC control element (CE) signaling).

With reference to the first aspect, in some possible implementations, this embodiment of the present invention may be applied to an MU scenario. Specifically, in uplink multi-user multiple input multiple output (MU-MIMO), because frequency domain resources of different terminals are not independent of each other, different terminals may use a same time-frequency resource for uplink transmission. For example, in the MU scenario, a PUSCH time-frequency resource in an uplink subframe in a cell is allocated to a plurality of terminals (UE 1 and UE 2), and an SRS time-frequency resource is allocated to UE 3. The UE 1 multiplexes a first PUSCH and an SRS based on a multiplexing mode configured by the network device. The UE 2 multiplexes a second PUSCH and the SRS based on a multiplexing mode configured by the network device. It further needs to ensure that reference signals (a block SRS and/or a DMRS) carried on an overlapping resource of the UE 1 and an overlapping resource of the UE 2 do not interfere with each other. In a specific implementation, reference signals on different overlapping resources may be orthogonal to avoid interference, or may be scrambled separately by using different scrambling codes, to avoid interference.

According to a second aspect, an embodiment of the present invention provides another data sending method. Described from a network device side, the method includes: sending, by a network device, resource location information of a first reference signal and a physical channel to a terminal, where the first reference signal is mapped on a first time-frequency resource, the first time-frequency resource partially or totally overlaps a second time-frequency resource corresponding to the physical channel, and a time-frequency resource corresponding to a part that is in the second time-frequency resource and that overlaps the first time-frequency resource is an overlapping resource; the overlapping resource is not used to transmit the physical channel, and a third time-frequency resource in the second time-frequency resource other than the overlapping resource is used to transmit the physical channel; or the overlapping resource is used to send a second reference signal, and a third time-frequency resource in the second time-frequency resource other than the overlapping resource is used to transmit the physical channel; or a second time-frequency resource corresponding to a symbol in which the overlapping resource is located is an overlapping region, the overlapping region is used to send a second reference signal, and a fourth time-frequency resource in the second time-frequency resource other than the overlapping region is used to transmit the physical channel; and the symbol is a DFT-S-OFDM symbol, an OFDM symbol, or a CP-OFDM symbol, where the first reference signal is used to sound uplink channel quality, and the second reference signal is orthogonal to the first reference signal; receiving, by the network device, the physical channel sent by the terminal; and receiving, by the network device, the second reference signal sent by the terminal.

It should be noted that, for some related content in the method embodiment of the second aspect, refer to related descriptions in the first aspect.

According to a third aspect, an embodiment of the present invention provides a terminal. The terminal is configured to implement the method described in the first aspect, and the terminal includes a receiving module and a sending module. The receiving module is configured to receive resource location information that is sent by a network device and that is of a first reference signal and a physical channel, where the first reference signal is mapped on a first time-frequency resource, the first time-frequency resource partially or totally overlaps a second time-frequency resource corresponding to the physical channel, and a time-frequency resource corresponding to a part that is in the second time-frequency resource and that overlaps the first time-frequency resource is an overlapping resource; the overlapping resource is not used to transmit the physical channel, and a third time-frequency resource in the second time-frequency resource other than the overlapping resource is used to transmit the physical channel; and the sending module is configured to send the physical channel to the network device on the third time-frequency resource; or the overlapping resource is used to send a second reference signal, and a third time-frequency resource in the second time-frequency resource other than the overlapping resource is used to transmit the physical channel; and the sending module is configured to send the second reference signal on the overlapping resource, and the sending module is further configured to send the physical channel on the third time-frequency resource; or a second time-frequency resource corresponding to a symbol in which the overlapping resource is located is an overlapping region, the overlapping region is used to send a second reference signal, and a fourth time-frequency resource in the second time-frequency resource other than the overlapping region is used to transmit the physical channel; the sending module is configured to send the second reference signal in the overlapping region, and the sending module is further configured to send the physical channel on the fourth time-frequency resource; and the symbol is a DFT-S-OFDM symbol, an OFDM symbol, or a CP-OFDM symbol, where the first reference signal is used to sound uplink channel quality, and the second reference signal is orthogonal to the first reference signal.

According to a fourth aspect, an embodiment of the present invention provides a network device. The network device is configured to implement the method described in the second aspect, and the network device includes a sending module and a receiving module. The sending module sends resource location information of a first reference signal and a physical channel to a terminal, where the first reference signal is mapped on a first time-frequency resource, the first time-frequency resource partially or totally overlaps a second time-frequency resource corresponding to the physical channel, and a time-frequency resource corresponding to a part that is in the second time-frequency resource and that overlaps the first time-frequency resource is an overlapping resource; the overlapping resource is not used to transmit the physical channel, and a third time-frequency resource in the second time-frequency resource other than the overlapping resource is used to transmit the physical channel; or the overlapping resource is used to send a second reference signal, and a third time-frequency resource in the second time-frequency resource other than the overlapping resource is used to transmit the physical channel; or a second time-frequency resource corresponding to a symbol in which the overlapping resource is located is an overlapping region, the overlapping region is used to send a second reference signal, and a fourth time-frequency resource in the second time-frequency resource other than the overlapping region is used to transmit the physical channel; and the symbol is a DFT-S-OFDM symbol, an OFDM symbol, or a CP-OFDM symbol, where the first reference signal is used to sound uplink channel quality, and the second reference signal is orthogonal to the first reference signal; and the receiving module is configured to receive the physical channel sent by the terminal; and the receiving module is further configured to receive the second reference signal sent by the terminal.

According to a fifth aspect, an embodiment of the present invention provides another terminal. The terminal includes a memory, a processor coupled to the memory, a transmitter, and a receiver. The transmitter is configured to send uplink data or a reference signal to a network device. The receiver is configured to receive data or information sent by the network device. The memory is configured to store program code and related data, a reference signal, and other information. The processor is configured to execute the program code stored in the memory, to perform a data sending method. The method is the method according to the first aspect.

According to a sixth aspect, an embodiment of the present invention provides another network device. The network device includes a memory, a processor coupled to the memory, a transmitter, and a receiver. The transmitter is configured to send data or information to a terminal. The receiver is configured to receive uplink data or a reference signal sent by the network device. The memory is configured to store program code and related data, a reference signal, and other information. The processor is configured to execute the program code stored in the memory, to perform a data sending method. The method is the method according to the second aspect.

According to a seventh aspect, an embodiment of the present invention provides a communications system. The communications system includes at least a terminal and a network device. The terminal is the terminal according to the third aspect, and the network device is the network device according to the fourth aspect; or the terminal is the terminal according to the fifth aspect, and the network device is the network device according to the sixth aspect.

According to an eighth aspect, an embodiment of the present invention provides a computer readable storage medium, and the computer readable storage medium stores an instruction (implementation code). When the instruction is run on a computer, the computer may be enabled to perform the method according to the first aspect based on the instruction, or the computer may be enabled to perform the method according to the second aspect based on the instruction According to a ninth aspect, an embodiment of the present invention provides a computer program product including an instruction. When the instruction is run on a computer, the computer may be enabled to perform the method according to the first aspect based on the instruction, or the computer may be enabled to perform the method according to the second aspect based on the instruction It can be learned that, during implementation of the embodiments of the present invention, the first reference signal (the SRS) may be sent in any symbol in a subframe. When the terminal sends the physical channel, if the time-frequency resource of the physical channel in the current subframe overlaps the time-frequency resource of the SRS, the terminal may multiplex the physical channel and the reference signal in one symbol, or may multiplex the physical channel and the reference signal in one time-frequency resource (including one RB or a plurality of RBs). The terminal may further send the reference signal of the terminal (including the SRS or the DMRS of the terminal) by using the overlapping resource or the overlapping region. In addition, a plurality of SRSs may be mapped in one subframe. In the subframe, the uplink data and the SRS may be simultaneously sent. That is, implementation of the embodiments of the present invention helps improve a sending speed of the SRS, reduce resource overheads, keep power spectral density balance, and ensure stability of an uplink throughput in communication transmission after the SRS capacity is enhanced.

DESCRIPTION OF DRAWINGS

Figure 1:
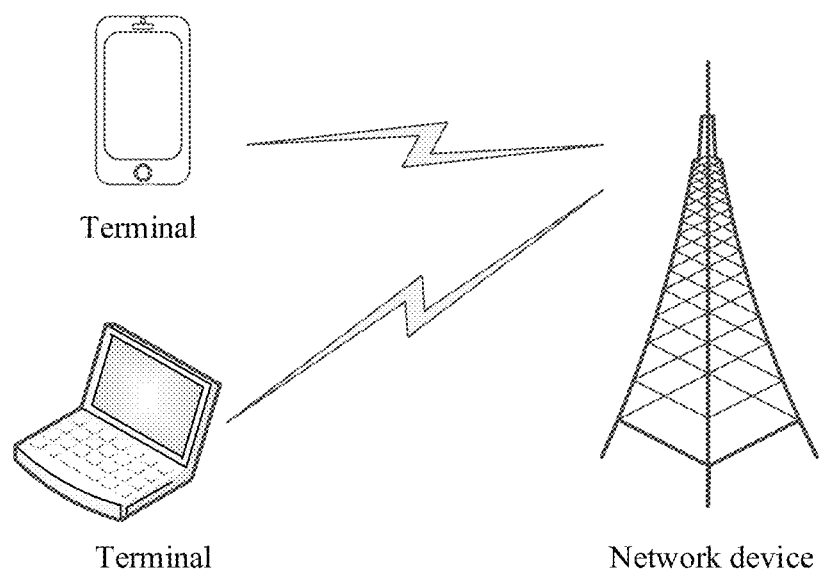
FIG. 1 is a schematic diagram of a communications system according to an embodiment of the present invention.

The following describes embodiments of the present invention with reference to the accompanying drawings in the embodiments of the present invention.

In an LTE system in the prior art, a base station measures channel quality of an uplink based on an SRS sent by UE. Because the SRS needs to reflect quality of channels at various frequency bands to the base station, in frequency domain, SRS transmission should cover a frequency band in which a base station scheduler is interested. Usually, the frequency band may be covered in the following manners.

In a first manner, a sufficient wideband SRS is sent to cover the entire frequency band of interest. When the wideband SRS is used for uplink transmission, the entire frequency band of interest may be reported to the base station by transmitting only one SRS in one symbol. Therefore, in terms of resource utilization, the entire bandwidth can be sounded by using fewer symbols, resource overheads are low, and a transmission speed is fast. However, when an uplink path loss is relatively high, because a power is evenly allocated to a relatively wide bandwidth, the wideband SRS transmission may lead to a relatively low received power spectral density, which degrades a channel estimation result.

In a second manner, a plurality of narrowband SRSs are sent and frequency hopping is performed in frequency domain, and then a series of sent SRSs are jointly used to cover the entire frequency band of interest. The narrowband SRSs can report the entire frequency band to the base station only by using symbols in a plurality of different subframes. In this way, available transmit powers may be gathered in a narrower frequency range, and frequency hopping is performed in the frequency band to improve gains. However, because the narrowband SRSs are distributed in different subframes, a speed of obtaining channel quality information by the base station is relatively slow.

In a third manner, the foregoing two manners are combined. A plurality of narrowband SRSs are continuously sent in one subframe, and then a series of the sent SRSs are jointly used to cover the entire frequency band of interest. In this manner, the UE continuously sends a plurality of SRSs in one subframe to sound different frequencies, so that the base station obtains quality information of channels of different frequencies as soon as possible. A sending speed is fast, and a power spectral density is low. However, a part of a time-frequency resource of a PUSCH is occupied by an SRS, as a result, the time-frequency resource cannot be used to carry a conventional PUSCH. Therefore, from a perspective of resource utilization, in this manner, resource overheads are high, and greater impact is exerted on a throughput of uplink data transmission.

It can be learned that, regardless of which one of the foregoing manners is used, there is a corresponding technical defect. If an SRS occupies a time-frequency resource of a PUSCH, the PUSCH cannot be transmitted on a symbol corresponding to the time-frequency resource. Especially in a TDD system, if an SRS and a PUCCH/PUSCH are transmitted on different RBs (a same symbol) in a subframe, when the UE sends the PUSCH and the SRS in one subframe, an uplink single-carrier characteristic is destroyed.

The following describes a communications system used in the embodiments of the present invention. FIG. 1 is a schematic architectural diagram of a communications system according to an embodiment of the present invention. The communications system includes at least a terminal and a network device described in the following embodiments. The terminal and the network device communicate with each other by using an air interface technology. The air interface technology may include existing 2G (e.g., a global system for mobile communications (GSM)), 3G (e.g., a UMTS, wideband code division multiple access (WCDMA), or time division-synchronous code division multiple access (TD-SCDMA)), 4G (e.g., frequency division duplex (FDD) LTE or TDD LTE), and a new radio access technology (New RAT) system, e.g., a future 4.5G or 5G system.

The network device is a device configured to communicate with the terminal. The network device may be a BTS (Base Transceiver Station) in GSM or CDMA, or may be an NB (NodeB) in WCDMA, or may be an evolved NodeB (eNB) in LTE, or a relay station, or a vehicle-mounted device, a wearable device, and an access network device in a future 5G network, or an access network device in a future evolved public land mobile network (PLMN).

The terminal may include a relay. Any device that can perform data communication with the network device may be considered as the terminal. In the present invention, the terminal in a general sense is described. In addition, the terminal may also be referred to as a mobile console, an access terminal, UE, a subscriber unit, a subscriber station, a mobile station, a remote station, a remote terminal, a mobile device, a user terminal, a wireless communications device, a user agent, a user apparatus, or the like. The terminal may be a device such as a mobile phone, a cordless phone, a session initiation protocol (SIP) phone, a wireless local loop (WLL) station, a tablet computer, a palmtop computer (PDA), a handheld device with a wireless communication function, a computing device, or another processing device connected to a wireless modem, a vehicle-mounted device, a wearable device, and a mobile station in a future 5G network, or a terminal in a future evolved PLMN network. The network device may support communication with a plurality of terminals at the same time.

A cell mentioned in the following embodiments may be a cell corresponding to a base station, and the cell may belong to a macro base station or a base station corresponding to a small cell. The small cell herein may include a metro cell, a micro cell, a pico cell, a femto cell, and the like. Such small cells feature small coverage and a low transmit power, and are applicable to providing a high-speed data transmission service.

To resolve the defect in the prior art, a difference between the communications system in the embodiments of the present invention and a communications system in the prior art includes at least: (1) In uplink transmission, an SRS (a first reference signal) may be sent in any symbol in a subframe. That is, the SRS (the first reference signal) may be carried in any symbol in a subframe, or may be carried in a plurality of symbols in a subframe. (2) A physical channel and a reference signal may be multiplexed in one symbol. When a physical channel and a reference signal are multiplexed in one symbol, a proper power offset is set for the physical channel mapped on the symbol, to increase a transmit power of the symbol, so as to balance the transmit power of the symbol and a transmit power of another symbol. (3) For a specific terminal, when the terminal needs to perform uplink data transmission with the network device, if the terminal determines that a time-frequency resource that is configured for the terminal in a current uplink subframe and that corresponds to a physical channel overlaps a time-frequency resource configured for another terminal to send a reference signal, the terminal may send a reference signal of the terminal by using an overlapping resource or an overlapping region.

The following describes nouns in the embodiments of the present invention.

Figure 2:
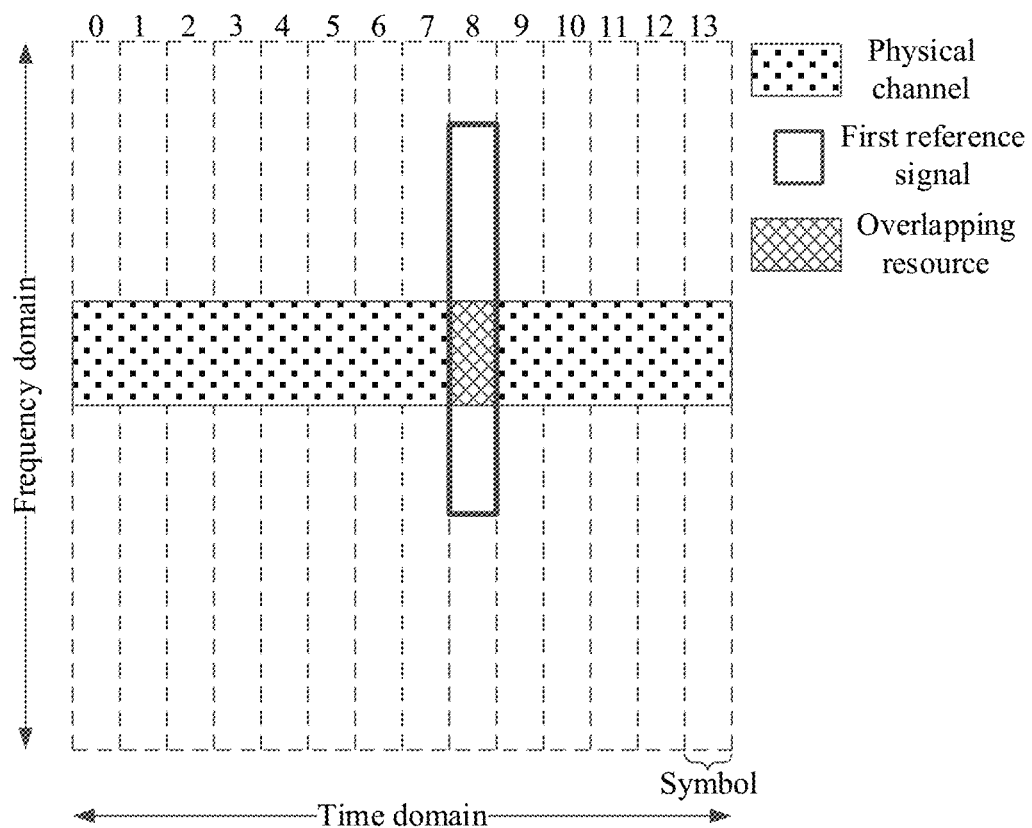
FIG. 2 is a schematic diagram of a scenario in which a time-frequency resource of a physical channel overlaps a time-frequency resource of a first reference signal in a subframe according to an embodiment of the present invention.

(1) Overlapping resource: FIG. 2 shows a subframe in uplink data transmission of a communications system according to an embodiment of the present invention. The subframe includes a time domain and a frequency domain, and each subframe includes a plurality of symbols (14 symbols in the figure). The symbol is a DFT-S-OFDM symbol, an OFDM symbol, a frequency division multiple access (FDMA) symbol, or a CP-OFDM symbol. OFDM is an orthogonal frequency division multiplexing technology, and is one of implementations of a multi-carrier transmission solution. A time length of the OFDM symbol depends on a spacing between subcarriers. A DFT-S-OFDM technology is used to perform DFT extension on a signal before OFDM inverse fast Fourier transform (IFFT) modulation is performed. Similarly, a time length of the DFT-S-OFDM symbol depends on a spacing between subcarriers. In the embodiments of the present invention, a first reference signal (an SRS) may be sent on a time-frequency resource corresponding to any symbol. Therefore, when a terminal needs to send a physical channel (e.g., a PUSCH or a PUCCH) in a current subframe, a time-frequency resource of the physical channel may overlap the time-frequency resource (located on the ninth symbol and numbered 8 in the figure, same below) of the first reference signal (the SRS) in the subframe. In this case, a time-frequency resource corresponding to a part that is in the time-frequency resource of the physical channel and that overlaps the time-frequency resource of the first reference signal (the SRS) is an overlapping resource.

Figure 3:
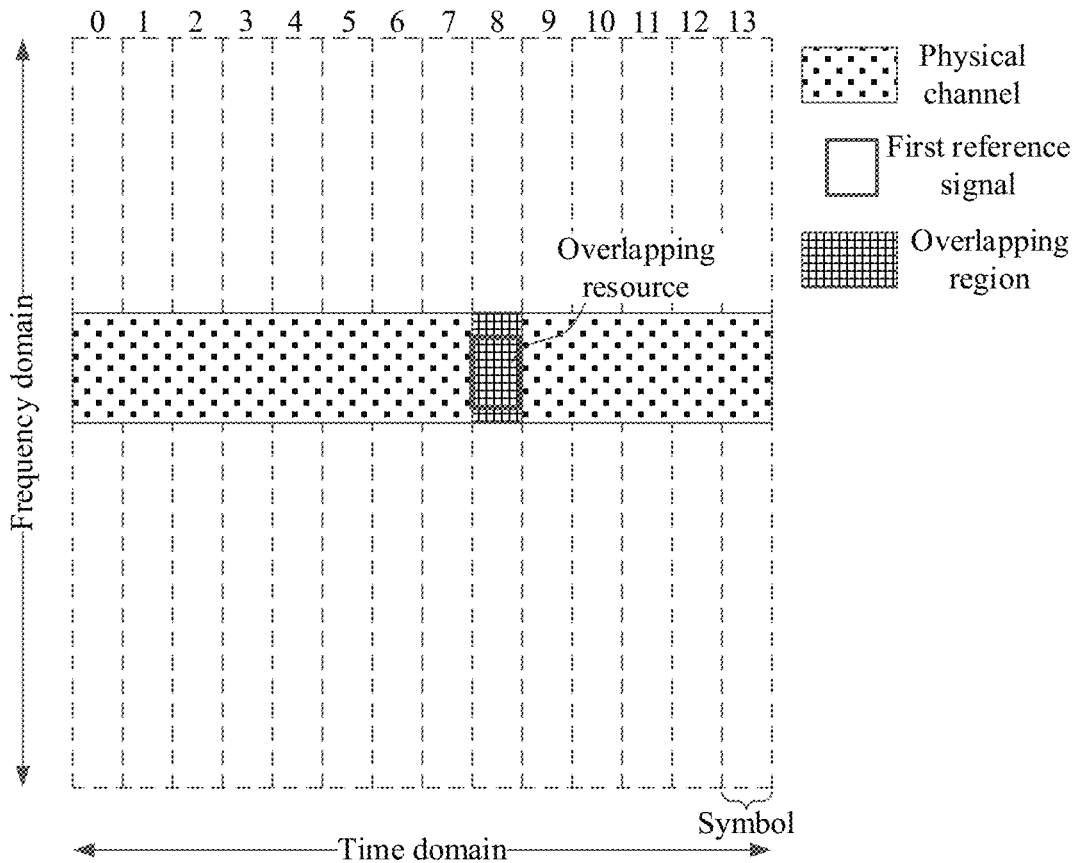
FIG. 3 is a schematic diagram of a scenario in which a time-frequency resource of a physical channel overlaps a time-frequency resource of a first reference signal in another subframe according to an embodiment of the present invention.

(2) Overlapping region: In time-frequency resources of a subframe, a bandwidth of a physical channel may be different from a bandwidth of a SRS. A time-frequency resource corresponding to a part that is in a time-frequency resource of the physical channel and that overlaps a time-frequency resource of a first reference signal (the SRS) is an overlapping resource. When the bandwidth of the physical channel is wider than a bandwidth of the overlapping resource, referring to FIG. 3, a second time-frequency resource corresponding to a symbol in which the overlapping resource is located is an overlapping region. That is, a time-frequency resource corresponding to a part that is of the physical channel and is mapped to a symbol in which the overlapping resource is located is the overlapping region. It may be understood that, in the embodiments of the present invention, a time-frequency resource and a symbol have a corresponding relationship (that is, a time-frequency resource occupies one or more symbols). In FIG. 3, a second time-frequency resource configured by a network device for a terminal corresponds to the first symbol to the fourteenth symbol (numbered 0 to 13), and the second time-frequency resource corresponding to the symbol in which the overlapping resource is located is the overlapping region. That is, a time-frequency resource of a "square shadow part" in the figure is the overlapping region, and a time-frequency resource in which a part that is of the "square shadow part" and that overlaps the first reference signal is located is the overlapping resource.

It may be understood that when the bandwidth of the physical channel is wider than the bandwidth of the overlapping resource, a range of the overlapping resource is smaller than a range of the overlapping region. That is, the overlapping resource is included in the overlapping region. When the bandwidth of the physical channel is narrower than or equal to the bandwidth of the first reference signal, and the bandwidth of the physical channel is equal to the bandwidth of the overlapping resource, the overlapping resource and the overlapping region are a same concept (referring to FIG. 2 and FIG. 3).

Figure 4:
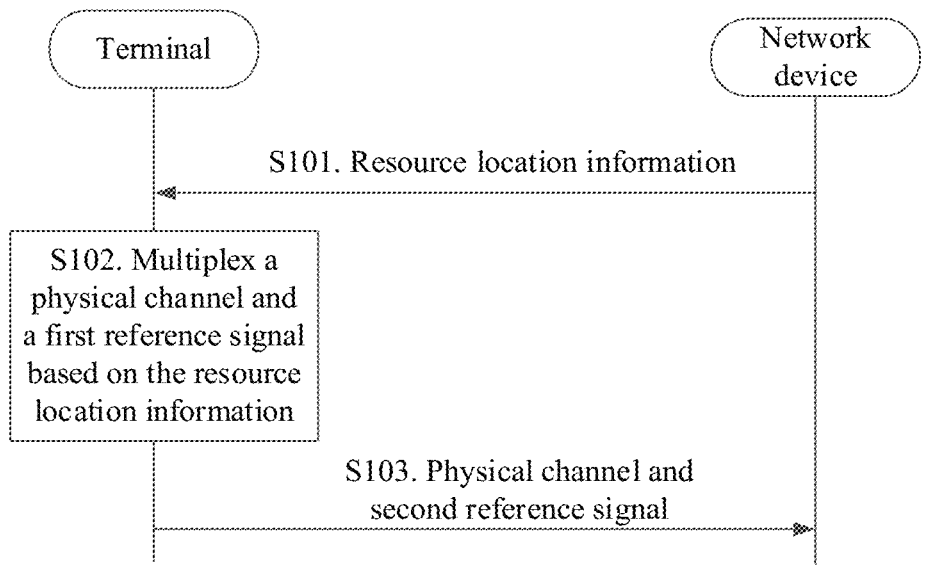
FIG. 4 is a schematic flowchart of a data sending method according to an embodiment of the present invention.

To resolve a problem of multiplexing a PUSCH and an SRS on a time-frequency resource in the prior art, and ensure that an SRS and a PUSCH can be simultaneously sent on a same RB, an embodiment of the present invention provides a data sending method, to reduce impact on an uplink throughput, improve a sending speed of a reference signal, reduce resource overheads, and keep power spectral density balance. Referring to FIG. 4, the method includes the following steps.

Step S101: A network device sends resource location information to a terminal. Correspondingly, the terminal receives the resource location information sent by the network device.

In this embodiment of the present invention, the resource location information is used to indicate locations occupied by a physical channel and a first reference signal in time-frequency resources. The resource location information may further be used to indicate a multiplexing mode used by the terminal when the time-frequency resource of the physical channel overlaps the time-frequency resource of the first reference signal. That is, the network device configures the time-frequency resource (that is, a second time-frequency resource) of the physical channel for the terminal in a cell, and further configures the time-frequency resource (that is, a first time-frequency resource) of the first reference signal for a terminal (the terminal or another terminal) in the cell. Therefore, the physical channel has a corresponding relationship with the second time-frequency resource, and the first reference signal has a corresponding relationship with the first time-frequency resource. When the terminal needs to send physical channel uplink data (referred to as sending the physical channel for short below) to the terminal, before sending the first reference signal to the network device, the terminal may determine, based on the resource location information, the multiplexing mode used when the time-frequency resource of the physical channel overlaps the time-frequency resource of the first reference signal.

The physical channel is used to carry uplink data. In a specific embodiment, the physical channel is a PUSCH or a PUCCH.

A configuration of the first reference signal is a cell-level configuration, and the first reference signal may be generated by another terminal, or may be generated by the terminal. The network device may perform channel quality measurement and channel estimation based on the first reference signal. Specifically, if the first reference signal is generated by another terminal, the terminal continues to perform the following steps S102 and S103; and if the first reference signal is generated by the terminal, the terminal sends the first reference signal to the network device on the first time-frequency resource, and sends the physical channel to the network device in a region in the second time-frequency resource other than an overlapping resource or an overlapping region.

Specifically, the network device may evaluate uplink channel quality based on the first reference signal, determine a frequency domain resource with relatively good channel quality, and further determine a location of an RB that should be allocated to an uplink of the terminal corresponding to the first reference signal, so as to perform uplink scheduling. The network device may further evaluate a downlink channel status based on an uplink channel status evaluated based on the first reference signal.

In a specific embodiment, the first reference signal may be an SRS transmitted independently. The first reference signal may be mapped on any symbol of a normal uplink subframe for transmission, or may be mapped on any symbol in an uplink pilot (UpPTS) of a special subframe for transmission.

The SRS may be configured by the network device in a semi-persistent manner by using higher layer signaling, or may be configured by the network device in a dynamic manner by using physical layer signaling.

In a specific embodiment, the network device may send the resource location information to the terminal in a dynamic manner by using physical layer signaling. For example, the resource location information is indicated by using UL grant signaling, and the network device schedules the terminal to send a PUSCH by using the UL grant. Specifically, the terminal determines, based on the UL grant, a format for sending the uplink PUSCH, including resource allocation and a transmission format. The resource allocation includes RB allocation and the like, and the transmission format includes a modulation scheme and the like. UE sends, based on the UL grant, the PUSCH in the indicated transmission format on an allocated time-frequency resource. Specifically, the uplink scheduling grant signaling may be sent to the scheduled terminal through a PDCCH in a DCI format 0 (format 0). The DCI format 0 may be used to dynamically trigger the UE to perform aperiodic CSI reporting, and is referred to as a CQI request. The CQI request may be used to trigger the terminal to feed back an aperiodic CSI report.

In another specific embodiment, the network device may send the resource location information to the terminal in a semi-persistent manner by using higher layer signaling. The resource location information is indicated by using RRC layer signaling. During semi-persistent scheduling by using RRC layer signaling, the RRC layer signaling specifies a semi-persistent scheduling period, and the network device only needs to allocate or specify configuration information once to the terminal through the PDCCH, the terminal can periodically and repeatedly use a same PUSCH time-frequency resource within the scheduling period. For example, the RRC layer signaling includes a sending period and a subframe offset of the SRS, and a bandwidth, a frequency domain start location, a comb, and a cyclic shift of the SRS. The terminal may generate a corresponding SRS based on the resource location information and the overlapping resource, to add the SRS to the overlapping resource.

Certainly, in this embodiment of the present invention, the resource location information may be implemented in various manners. For example, the resource location information includes MAC layer signaling (MAC CE signaling). The foregoing descriptions of the specific implementations should not be considered as a limitation on the present invention.

Step S102: The terminal multiplexes a physical channel and a first reference signal based on the resource location information.

In this embodiment of the present invention, the first reference signal is mapped on the first time-frequency resource (the first time-frequency resource is the time-frequency resource of the first reference signal). That is, the first reference signal is carried in the first time-frequency resource. Herein, the first time-frequency resource is only used to distinguish from the following time-frequency resource (the second time-frequency resource) of the physical channel. The time-frequency resource of the first reference signal may be located in any symbol of the current subframe.

In a specific embodiment, when the terminal finds, based on the resource location information, that a part or all of the time-frequency resource (referred to as the first time-frequency resource below) of the first reference signal is located in the time-frequency resource (the second time-frequency resource) of the physical channel, the overlapping resource between the first time-frequency resource and the second time-frequency resource is not used to transmit the PUSCH; and the overlapping resource is not used to send a reference signal either. A time-frequency resource of the physical channel other than the first time-frequency resource is used to transmit the physical channel. The first reference signal is generated by the terminal or another terminal.

In another specific embodiment, when the terminal finds, based on the resource location information, that a part or all of the first time-frequency resource is located in the second time-frequency resource, the overlapping resource between the first time-frequency resource and the second time-frequency resource is not used to transmit the PUSCH; the overlapping resource is used to send an SRS; and a time-frequency resource of the physical channel other than the first time-frequency resource is used to transmit the physical channel. The first reference signal is generated by another terminal, the SRS is generated by the terminal, and the network device may sound uplink channel quality of the terminal by using the SRS. The SRS is orthogonal to the first reference signal.

In still another specific embodiment, when the terminal finds, based on the resource location information, that a part or all of the first time-frequency resource is located in the second time-frequency resource, the overlapping resource between the first time-frequency resource and the second time-frequency resource is used to send a DMRS, and a time-frequency resource of the physical channel in the second time-frequency resource other than the overlapping resource is used to transmit the physical channel; and the network device may demodulate a signal of the terminal by using the DMRS. The DMRS is transmitted together with the physical channel. In a specific implementation, the DMRS is preset at a preset location in the second time-frequency resource. After the overlapping resource appears, the terminal configures the overlapping resource to carry the DMRS, and a time-frequency resource originally used to carry the DMRS is used to transmit the physical channel. The DMRS is orthogonal to the first reference signal.

In addition, in a specific application scenario, when a bandwidth corresponding to the first time-frequency resource is narrower than a bandwidth corresponding to the second time-frequency resource, a second time-frequency resource corresponding to a symbol in which the overlapping resource is located is the overlapping region.

In a specific embodiment, the overlapping region is not used to transmit the physical channel. In addition, the overlapping resource is not used to send the reference signal (the SRS or the DMRS). A time-frequency resource of the physical channel in the second time-frequency resource other than the overlapping region is used to transmit the physical channel.

In another specific embodiment, the overlapping region is not used to transmit the physical channel. The overlapping region is used to send the SRS; and a time-frequency resource of the physical channel in the second time-frequency resource other than the overlapping region is used to transmit the physical channel.

In still another specific embodiment, the overlapping region is not used to transmit the physical channel. The overlapping region is used to send the DMRS; and a time-frequency resource of the physical channel in the second time-frequency resource other than the overlapping region is used to transmit the physical channel.

In this embodiment of the present invention, when a bandwidth of the overlapping resource is narrower than a bandwidth of the physical channel, the terminal sets different power offsets for a physical channel of the symbol in which the overlapping resource is located and a physical channel of a remaining symbol, to balance a transmit power of the symbol in which the overlapping resource is located and a transmit power of the remaining symbol. The power offset is a coefficient (usually in a unit of dB) used to determine the power of the physical channel, and different power offsets may increase or decrease the transmit power of the physical channel.

The remaining symbol is a symbol in symbols corresponding to the second time-frequency resource other than the symbol in which the overlapping resource is located. For example, in FIG. 3, the symbols corresponding to the second time-frequency resource is the first symbol to the fourteenth symbol (numbered 0 to 13), the symbol in which the overlapping resource is located is the ninth symbol (numbered 8), and the remaining symbols are symbols numbered 0 to 7 and 9 to 13.

It can be learned that, in this embodiment of the present invention, the second reference signal sent by using the overlapping resource or the overlapping region may be an SRS or a DMRS. The second reference signal is orthogonal to the first reference signal. The terminal may implement orthogonality between the second reference signal and the first reference signal in a plurality of manners. For example, when the second reference signal and the first reference signal have a same bandwidth and totally overlap in frequency domain, the terminal may implement orthogonality between the second reference signal and the first reference signal in an overall cyclic shift manner; and when the second reference signal and the first reference signal do not have a same bandwidth or do not overlap in frequency domain, the terminal may implement orthogonality between the second reference signal and the first reference signal in a frequency domain comb manner, an orthogonal cover code (OCC) manner, a block orthogonal manner, or the like.

In this embodiment of the present invention, the block orthogonality means that a frequency domain bandwidth of a reference signal is divided into blocks, each block includes a fixed quantity of frequency domain bandwidths (that is, a reference signal sequence on each block has a corresponding length), and the terminal determines a corresponding block based on a bandwidth of the overlapping resource or the overlapping region, and performs cyclic shift on different reference signals in the block of the overlapping resource or the overlapping region, to enable reference signal sequences in the block of the overlapping resource or the overlapping region to be orthogonal, so that the second reference signal and the first reference signal that do not have a same bandwidth or do not overlap in frequency domain are orthogonal. In a specific implementation, block orthogonality may be implemented by using a sequence code division orthogonal block wise technology.

It needs to be noted that the multiplexing mode may be configured by the network device for the terminal in a semi-persistent manner by using higher layer signaling, or may be configured by the network device for the terminal in a dynamic manner by using physical layer signaling.

Step S103: The terminal sends the physical channel and a second reference signal to the network device.

When the first reference signal is generated by another terminal, after the terminal determines the multiplexing mode of the physical channel and the first reference signal based on the resource location information, the terminal sends uplink data, the DMRS, and the SRS (if such exists) that are carried in the second time-frequency resource to the network device based on the specific multiplexing mode.

When the first reference signal is generated by the terminal, the first reference signal includes the SRS, the terminal directly sends the first reference signal to the network device on the first time-frequency resource, and sends uplink data to the network device on a time-frequency resource of the physical channel in the second time-frequency resource other than the overlapping resource or the overlapping region.

It can be learned that, during implementation of this embodiment of the present invention, the first reference signal (the SRS) may be sent in any symbol in a subframe. When the terminal sends the physical channel, if the time-frequency resource of the physical channel in the current subframe overlaps the time-frequency resource of the SRS, the terminal may multiplex the physical channel and the reference signal in one symbol, or may multiplex the physical channel and the reference signal in one time-frequency resource (including one RB or a plurality of RBs). The terminal may further send the reference signal of the terminal (including the SRS or the DMRS of the terminal) by using the overlapping resource or the overlapping region. In addition, a plurality of SRSs may be mapped in one subframe. In the subframe, the uplink data and the SRS may be simultaneously sent. That is, implementation of this embodiment of the present invention helps improve a sending speed of the SRS, reduce resource overheads, keep power spectral density balance, and ensure stability of an uplink throughput in communication transmission after an SRS capacity is enhanced.

Figure 5:
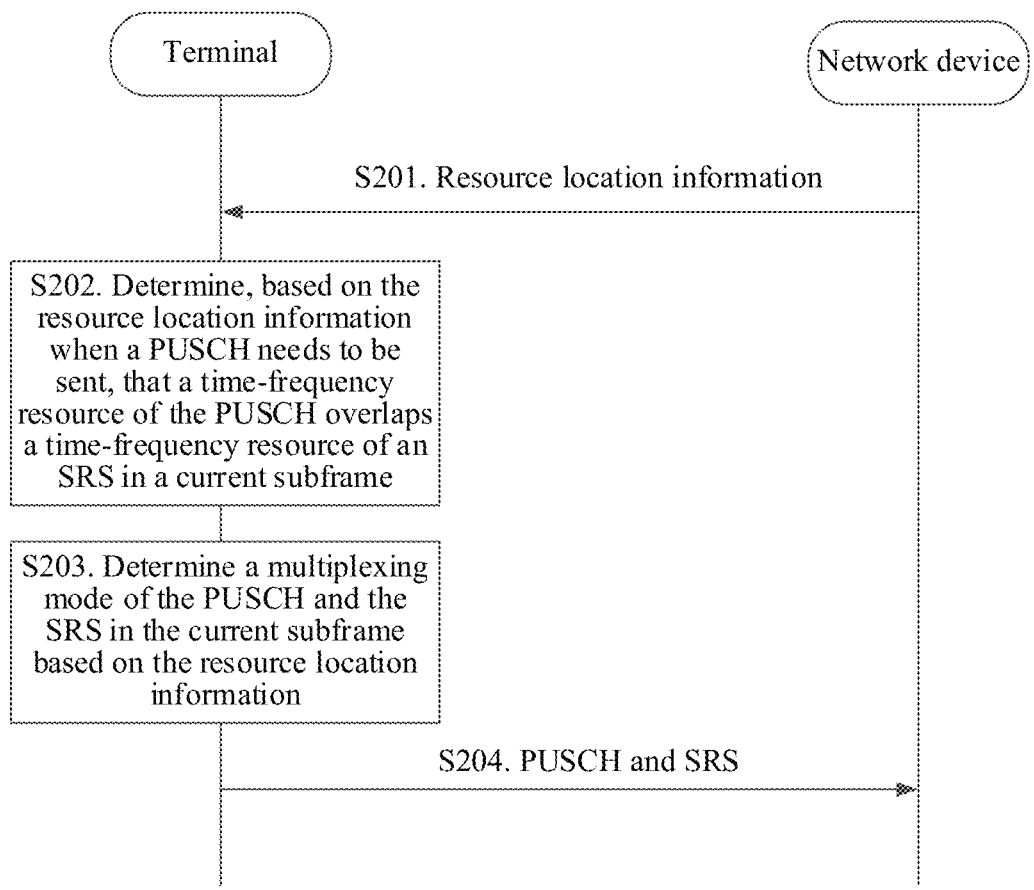
FIG. 5 is a schematic flowchart of another data sending method according to an embodiment of the present invention.

Referring to FIG. 5, an embodiment of the present invention provides another data sending method. The method includes the following steps.

Step S201: A network device sends resource location information to a terminal. Correspondingly, the terminal receives the resource location information sent by the network device.

In this embodiment of the present invention, the resource location information is used to indicate locations occupied by a physical channel and a first reference signal in time-frequency resources. The resource location information may further be used to indicate a multiplexing mode used by the terminal when the time-frequency resource of the physical channel overlaps the time-frequency resource of the first reference signal. The physical channel is used to carry uplink data, and the physical channel may be, for example, a PUSCH or a PUCCH. The physical channel further carries a DMRS. The first reference signal may be generated by another terminal or the terminal, and is used to sound uplink channel quality, and the first reference signal is, for example, an SRS.

To better understand the technical solutions of the embodiments of the present invention, in the method embodiment described below, a solution in which the physical channel is a PUSCH, the demodulation reference signal is a DMRS, and the first reference signal is an SRS is described in detail.

The SRS is a signal used to measure radio CSI. The terminal or another terminal may be configured to send, in a periodic or aperiodic manner, the SRS to the network device on any symbol in a current transmit subframe based on parameters such as a bandwidth, a frequency domain location, a period, and a subframe offset that are indicated by the network device. The terminal may determine, based on the resource location information, a specific time-frequency resource occupied in the current transmit subframe by transmission of each SRS by each UE in a cell. For SRS transmission in the entire cell, because each SRS is used to sound uplink channel quality, each specific SRS transmission policy needs to be combined with a scheduling policy, a service characteristic, and the like of the network device.

In PUSCH transmission, the DMRS may be used to demodulate a PUSCH-related signal. That is, the DMRS is carried in the time-frequency resource of the PUSCH, and a bandwidth of the DMRS is the same as a bandwidth of the PUSCH. That is, a sequence length of the DMRS is consistent with a quantity of subcarriers of the PUSCH. Specifically, the DMRS may be carried in a fourth symbol of each timeslot in the current subframe. In a specific implementation, the DMRS may alternatively be carried in another symbol.

Step S202: When needing to send a PUSCH, the terminal determines, based on the resource location information, that a time-frequency resource of the PUSCH overlaps a time-frequency resource of an SRS in a current subframe.

When the terminal needs to send uplink data carried on the PUSCH (referred to as sending the PUSCH for short below), the terminal determines whether an SRS that overlaps the time-frequency resource of the PUSCH exists in the time-frequency resources of the current subframe. If the SRS does not exist, the terminal directly sends the PUSCH to the network device. If the SRS exists, the terminal performs the following step.

Step S203: The terminal determines a multiplexing mode of the PUSCH and the SRS in the current frame based on the resource location information.

In a specific embodiment, when determining that the time-frequency resource of the PUSCH overlaps the time-frequency resource of the SRS, the terminal multiplexes the PUSCH and the SRS based on the multiplexing mode indicated by the resource location information. The SRS may be generated by another terminal, or may be generated by the terminal.

In this embodiment of the present invention, the terminal multiplexes the PUSCH and the SRS in a plurality of modes. The following first describes, by using examples, several multiplexing modes of the PUSCH and the SRS when the SRS is generated by another terminal.

(1) Multiplexing mode 1: In an embodiment of the multiplexing mode 1, the terminal performs rate matching on an overlapping resource or an overlapping region between the time-frequency resource of the PUSCH and the time-frequency resource of the SRS, to enable the overlapping resource or the overlapping region to be not used to transmit the PUSCH and not used to send a reference signal either. A time-frequency resource in the time-frequency resource of the PUSCH other than the overlapping resource or the overlapping region is used to transmit the PUSCH.

Figure 6:
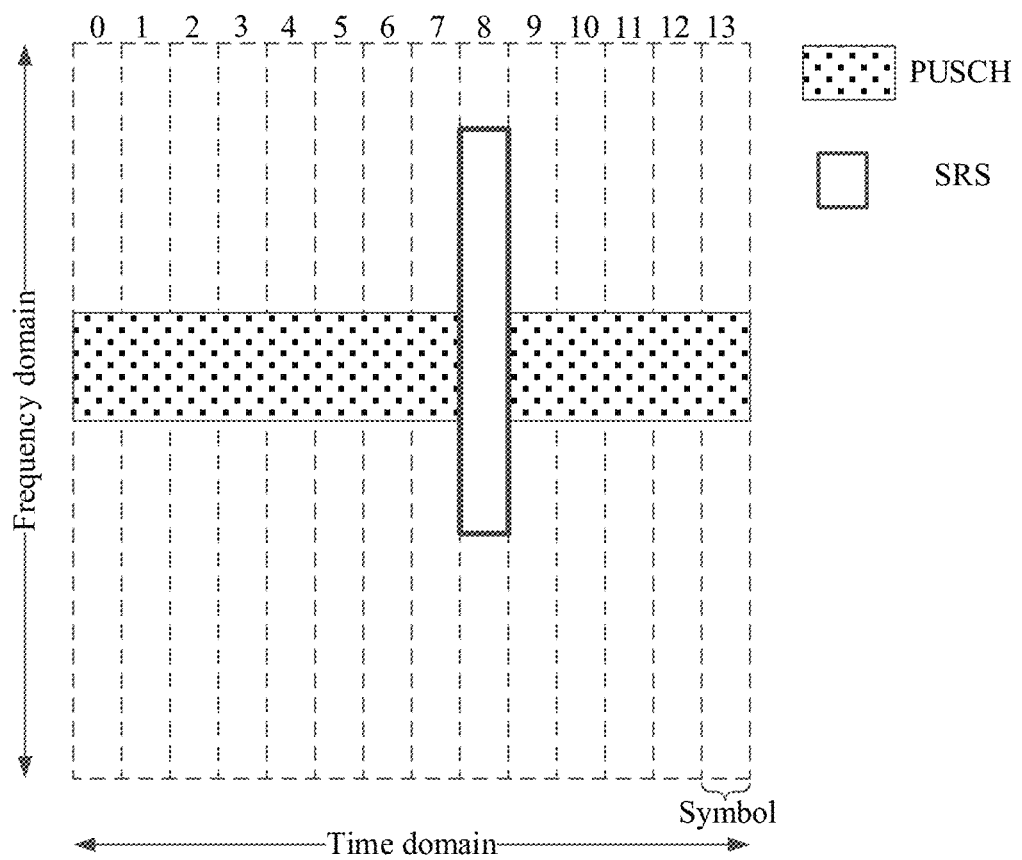
FIG. 6 is a schematic diagram of a scenario of a multiplexing mode according to an embodiment of the present invention.

For example, when a bandwidth of the PUSCH is narrower than or equal to a bandwidth of the SRS, and the bandwidth of the PUSCH is equal to a bandwidth of the overlapping resource, referring to FIG. 6, a current subframe shown in FIG. 6 includes 14 symbols, the SRS is carried in the ninth symbol (numbered 8, same below), and the overlapping resource between the time-frequency resource of the PUSCH and the time-frequency resource of the SRS is located in the ninth symbol. Then, the terminal performs rate matching on the overlapping resource, to enable the overlapping resource to be not used to send the PUSCH. A part (e.g., a gray shadow part in the figure) in the time-frequency resource of the PUSCH other than the overlapping resource continues to be used to transmit the PUSCH.

Figure 7:
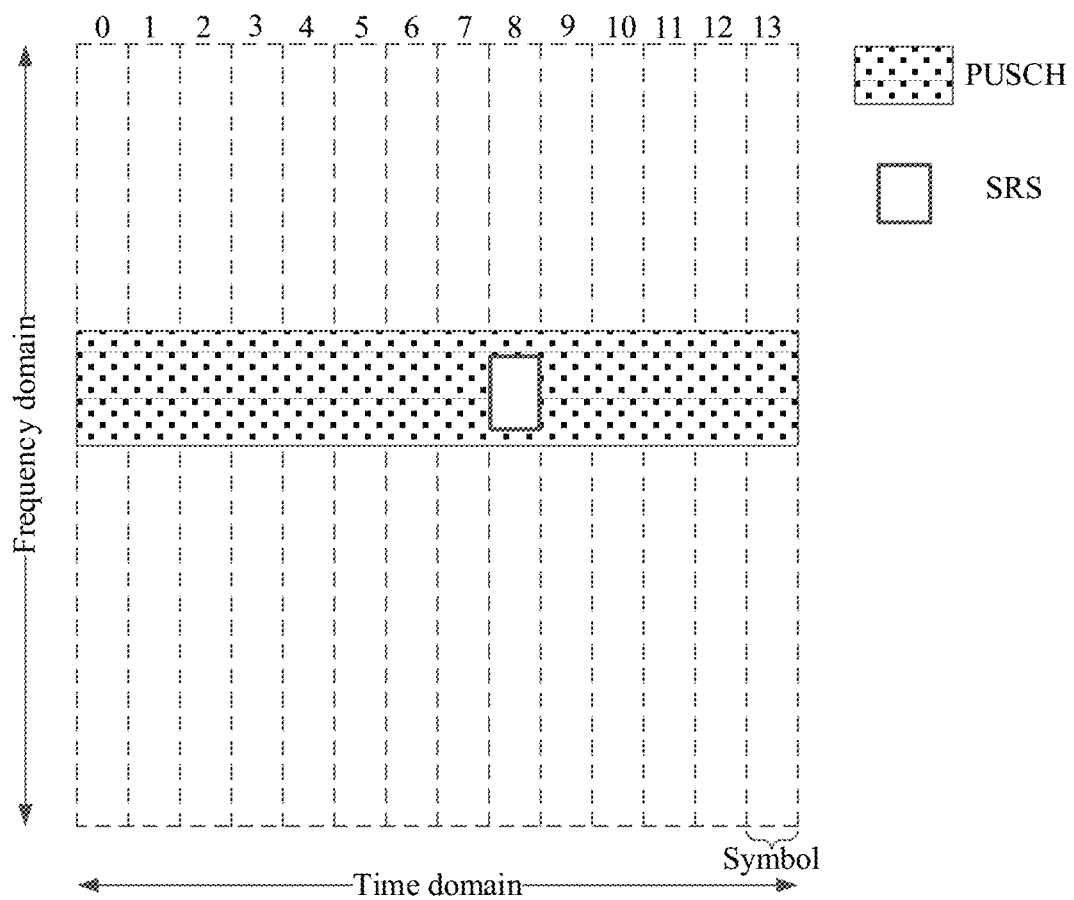
FIG. 7 is a schematic diagram of a scenario of another multiplexing mode according to an embodiment of the present invention.

For example, when the bandwidth of the PUSCH is wider than the bandwidth of the overlapping resource, referring to FIG. 7, in this case, there may be two implementation forms.

In an implementation form 1a, the overlapping resource between the time-frequency resource of the PUSCH and the time-frequency resource of the SRS is located in the ninth symbol. The terminal performs rate matching on the overlapping resource, to enable the overlapping resource to be not used to send the PUSCH. A part in the time-frequency resource of the PUSCH other than the overlapping resource continues to be used to transmit the PUSCH. Because the overlapping resource is not used to send the PUSCH, a transmit power of the ninth symbol is lower than a transmit power of other symbols in the subframe. To avoid that transmit powers of the terminal in different symbols in the subframe are unbalanced, in this case, the terminal may set different power offsets for the transmit power of the ninth symbol and the transmit power of the other symbols, and perform power boosting on uplink data carried in a part in the overlapping region other than the overlapping resource in the ninth symbol. In this way, the ninth symbol has the transmit power equivalent to the transmit power of the other symbols.

In an implementation form 1b, the overlapping region between the time-frequency resource of the PUSCH and the time-frequency resource of the SRS is also located in the ninth symbol. Therefore, the terminal performs rate matching on the overlapping region, to enable the overlapping region to be not used to send the PUSCH. A part in the time-frequency resource of the PUSCH other than the overlapping region continues to be used to transmit the PUSCH.

(2) Multiplexing mode 2: In an embodiment of the multiplexing mode 2, after the terminal performs rate matching on an overlapping resource or an overlapping region between the time-frequency resource of the PUSCH and the time-frequency resource of the SRS, the overlapping resource or the overlapping region is not used to transmit the PUSCH. The overlapping region is used to send the sounding reference signal, and a time-frequency resource in the time-frequency resource of the PUSCH other than the overlapping resource or the overlapping region is used to transmit the PUSCH. For ease of description, the sounding reference signal is referred to as a block SRS below. The block SRS is generated by the terminal and may be used to sound channel quality at a frequency band corresponding to the overlapping resource or the overlapping region. In the overlapping resource or the overlapping region, the block SRS remains orthogonal to the SRS. In a specific embodiment, when the block SRS and the SRS have a same sequence length and totally overlap in frequency domain, the terminal may implement orthogonality between the block SRS and the SRS in a cyclic shift manner; and when the block SRS and the SRS do not have a same sequence length or do not totally overlap in frequency domain, the terminal may implement orthogonality between the block SRS and the SRS in a frequency domain comb manner, an OCC manner, a block wise manner, or the like.

Figure 8:
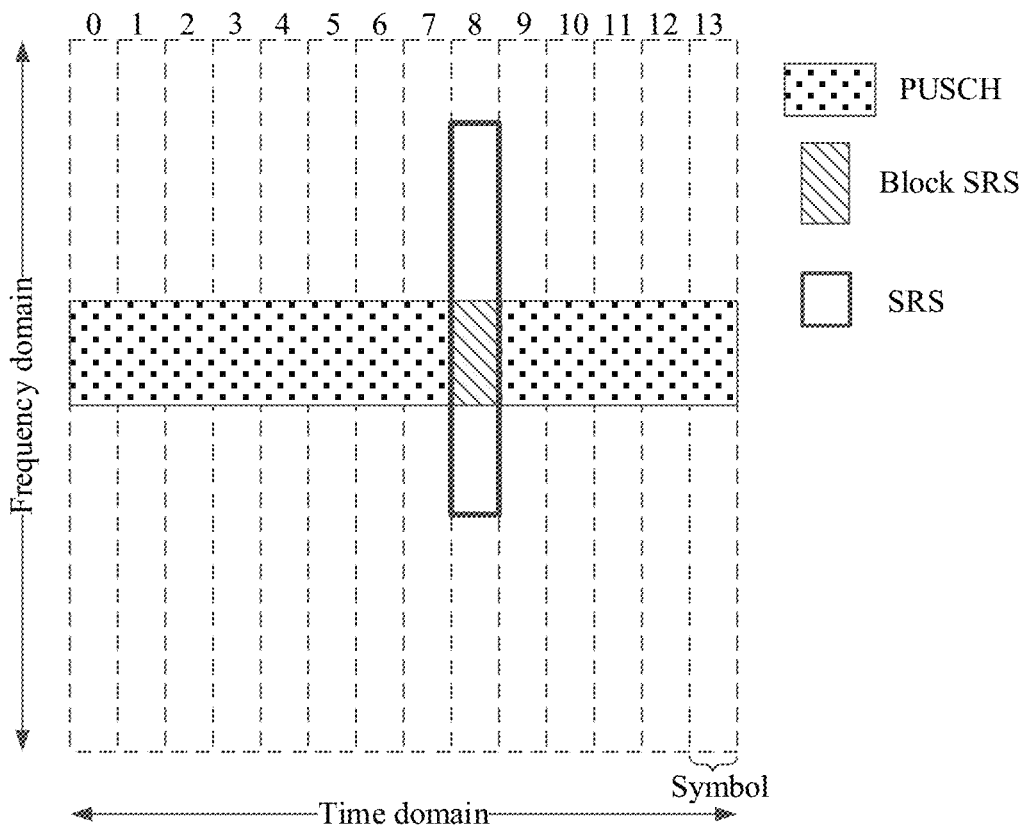
FIG. 8 is a schematic diagram of a scenario of still another multiplexing mode according to an embodiment of the present invention.

For example, when a bandwidth of the PUSCH is narrower than or equal to a bandwidth of the SRS, and the bandwidth of the PUSCH is equal to a bandwidth of the overlapping resource, referring to FIG. 8, a current subframe shown in FIG. 8 includes 14 symbols, the SRS is carried in the ninth symbol, and the overlapping resource between the time-frequency resource of the PUSCH and the time-frequency resource of the SRS is located in the ninth symbol. In this case, the network device needs to configure an orthogonal resource for the block SRS. The overlapping resource between the time-frequency resource of the PUSCH and the time-frequency resource of the SRS is not used to transmit the PUSCH, but is used to send the block SRS (a shadow part in the figure). The block SRS remains orthogonal to the SRS are in a block wise manner.

For example, when the bandwidth of the PUSCH is wider than the bandwidth of the overlapping resource, there may be two implementation forms.

Figure 9:
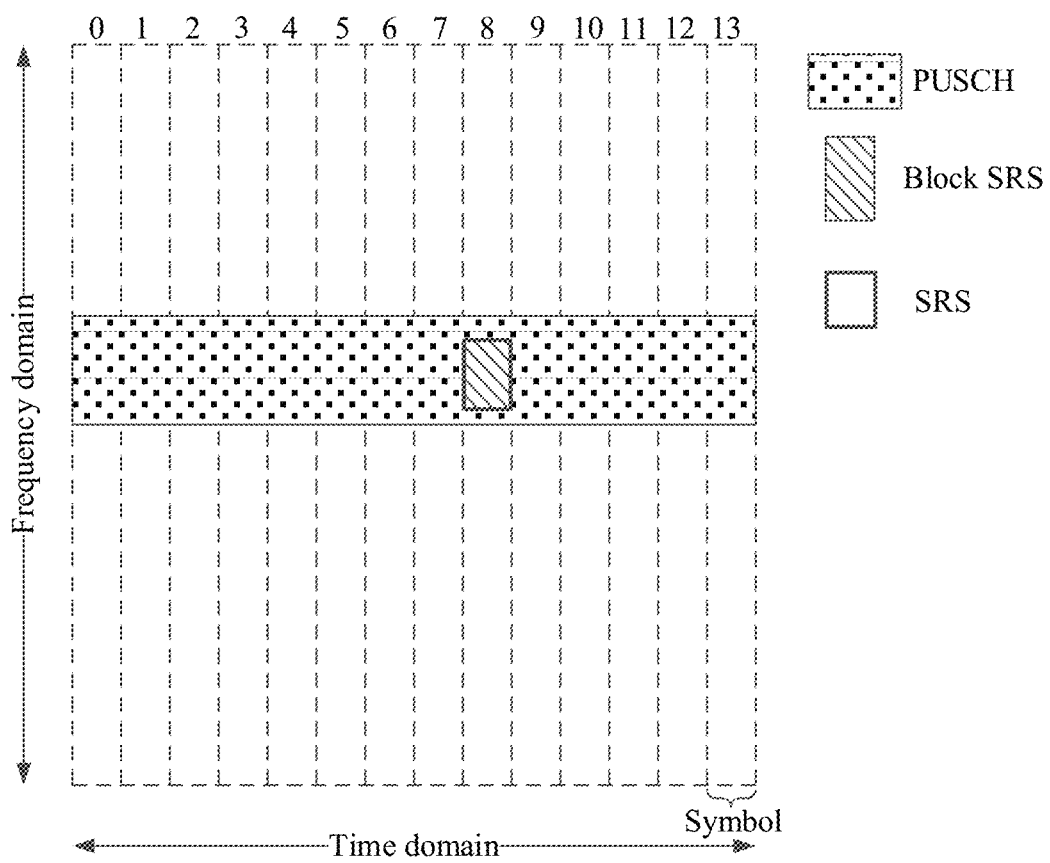
FIG. 9 is a schematic diagram of a scenario of yet another multiplexing mode according to an embodiment of the present invention.

Referring to FIG. 9, in an implementation form 2a, the overlapping resource between the time-frequency resource of the PUSCH and the time-frequency resource of the SRS is located in the ninth symbol. The terminal performs rate matching on the overlapping resource, to enable the overlapping resource to be not used to send the PUSCH. The overlapping resource is used to send the block SRS, and the block SRS remains orthogonal to the SRS are in a block wise manner. A part in the time-frequency resource of the PUSCH other than the overlapping resource continues to be used to transmit the PUSCH. Because a transmit power of the ninth symbol is lower than a transmit power of other symbols in the subframe. To avoid that transmit powers of the terminal in different symbols in the subframe are unbalanced, in this case, the terminal may set different power offsets for the transmit power of the ninth symbol and the transmit power of the other symbols, and perform power boosting on uplink data carried in a part in the overlapping region other than the overlapping resource in the ninth symbol. In this way, the ninth symbol has the transmit power equivalent to the transmit power of the other symbols.

Figure 10:
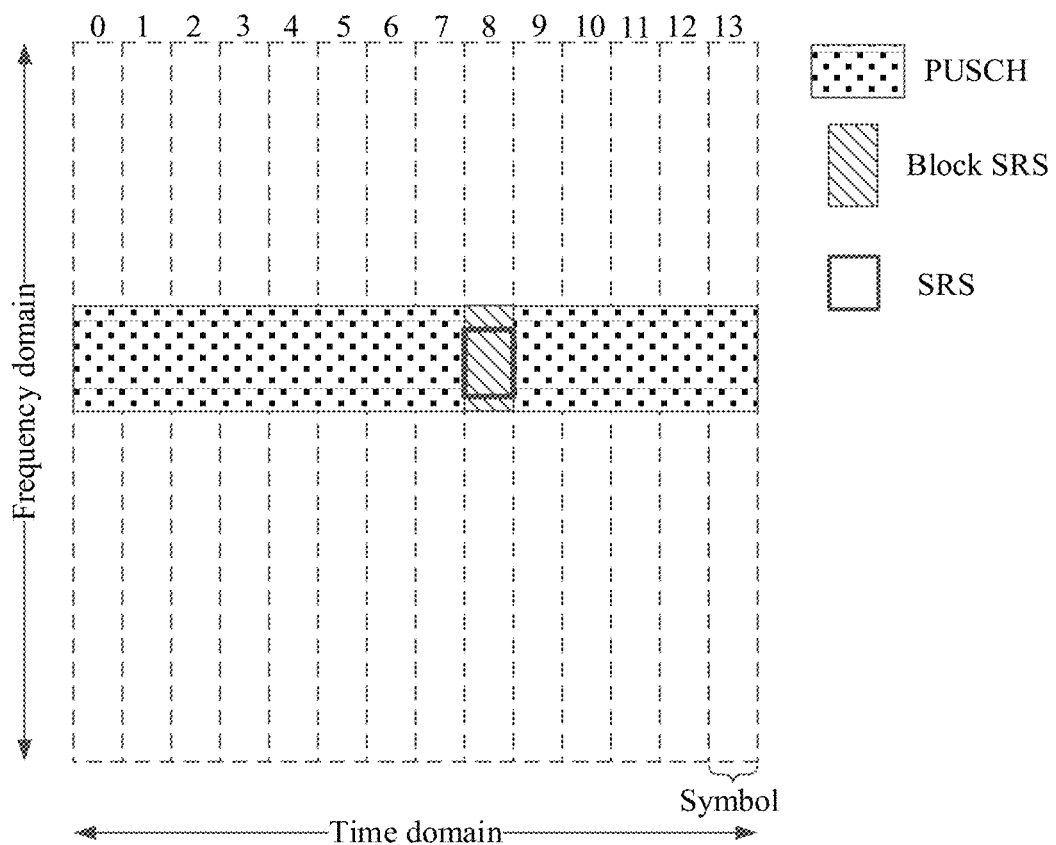
FIG. 10 is a schematic diagram of a scenario of still yet another multiplexing mode according to an embodiment of the present invention.

Referring to FIG. 10, in an implementation form 2b, the overlapping region between the time-frequency resource of the PUSCH and the time-frequency resource of the SRS is also located in the ninth symbol. Therefore, the terminal performs rate matching on the overlapping region, to enable the overlapping region to be not used to send the PUSCH. The overlapping region is used to send the block SRS, and the block SRS remains orthogonal to the SRS are in a block wise manner. A part in the time-frequency resource of the PUSCH other than the overlapping region continues to be used to transmit the PUSCH.

(3) Multiplexing mode 3: In an embodiment of the multiplexing mode 3, an overlapping region is not used to transmit the PUSCH. The network device configures an orthogonal resource for the DMRS, and the terminal correspondingly configures the overlapping region to be used to send the DMRS. A time-frequency resource in the time-frequency resource of the PUSCH other than the overlapping region is used to transmit the PUSCH. The DMRS is generated by the terminal and may be used to demodulate a PUSCH signal. Because a transmission bandwidth of the PUSCH needs to be demodulated, a sequence length of the DMRS is consistent with a quantity of subcarriers of the PUSCH. The DMRS is originally preset in the time-frequency resource of the PUSCH. In an overlapping resource or the overlapping region, the DMRS remains orthogonal to the SRS. In a specific embodiment, when the DMRS and the SRS have a same bandwidth and totally overlap in frequency domain, the terminal may implement orthogonality between the DMRS and the SRS in a cyclic shift manner; and when the DMRS and the SRS do not have a same bandwidth or do not totally overlap in frequency domain, the terminal may implement orthogonality between the DMRS and the SRS in a frequency domain comb manner, an OCC manner, a block wise manner, or the like.

Figure 11:
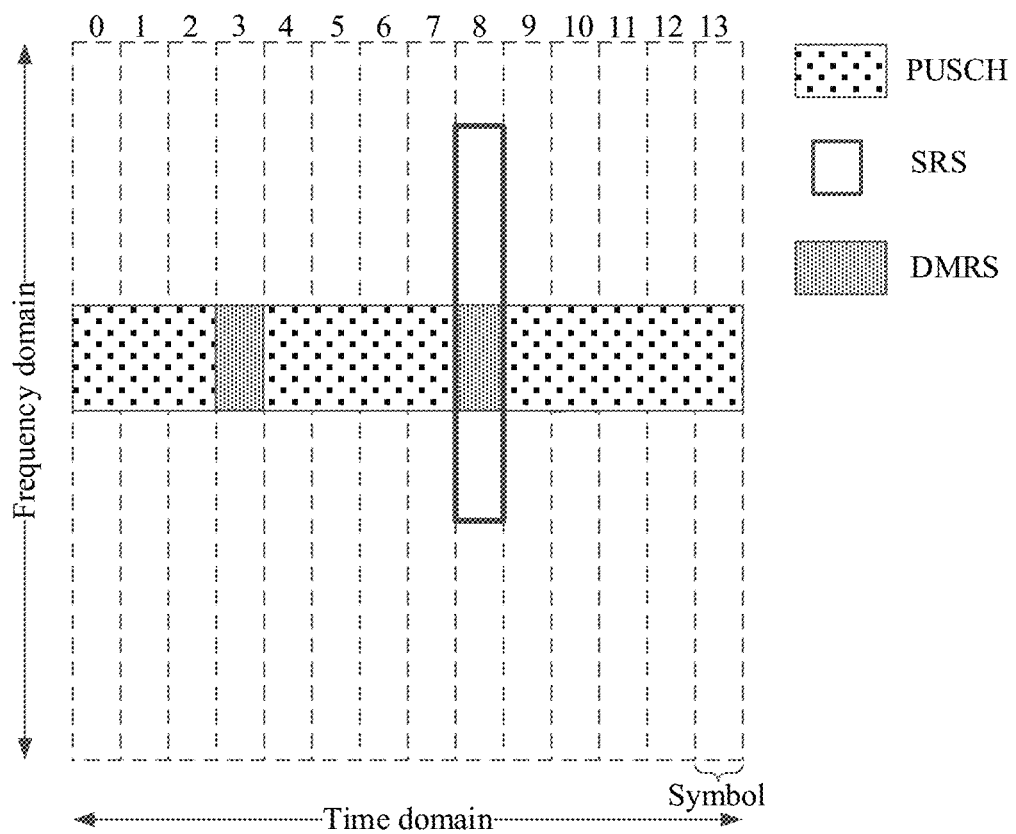
FIG. 11 is a schematic diagram of a scenario of a further multiplexing mode according to an embodiment of the present invention.

For example, when a bandwidth of the PUSCH is narrower than or equal to a bandwidth of the SRS, and the bandwidth of the PUSCH is equal to a bandwidth of the overlapping resource, referring to FIG. 11, a current subframe shown in FIG. 11 includes 14 symbols, the SRS is carried in the ninth symbol, and originally preset DMRSs are carried in the fourth symbol (numbered 3) and the eleventh symbol (numbered 10). In this multiplexing mode, the overlapping region is not used to transmit the PUSCH. The terminal may reconfigure the DMRS originally carried in the eleventh symbol, and a reconfigured RMDS is carried in the overlapping region corresponding to the ninth symbol. A time-frequency resource in the time-frequency resource of the PUSCH other than the overlapping region is used to transmit the PUSCH, including: A time-frequency resource (a dashed region in the PUSCH) that is of the PUSCH and that is mapped on the eleventh symbol is used to carry uplink data.

Figure 12:
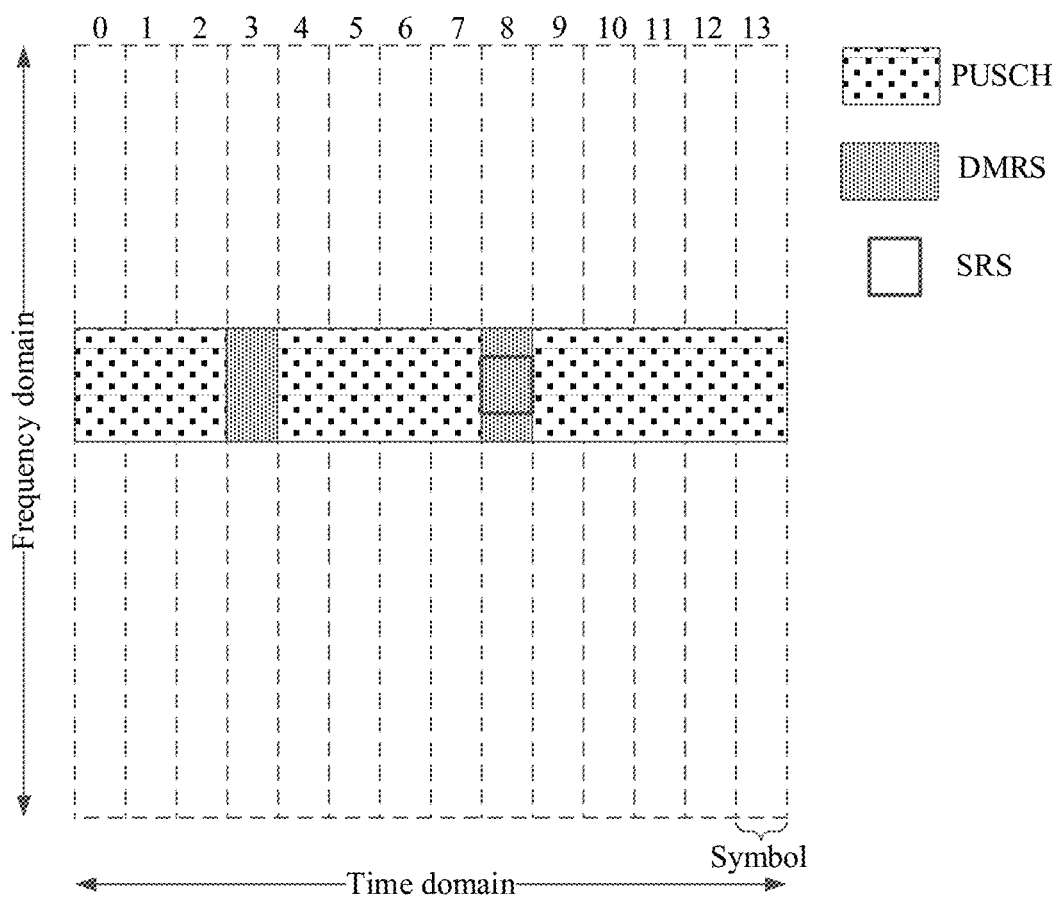
FIG. 12 is a schematic diagram of a scenario of a still further multiplexing mode according to an embodiment of the present invention.

For example, when the bandwidth of the PUSCH is wider than the bandwidth of the overlapping resource, referring to FIG. 12, similarly, the overlapping region is not used to transmit the PUSCH. The terminal may reconfigure the RMDS originally carried in the eleventh symbol, and a reconfigured RMDS is carried in the overlapping region corresponding to the ninth symbol. A time-frequency resource in the time-frequency resource of the PUSCH other than the overlapping region is used to transmit the PUSCH, including: A time-frequency resource (a dashed region in the PUSCH) that is of the PUSCH and that is mapped on the eleventh symbol is used to carry uplink data.

Figure 13:
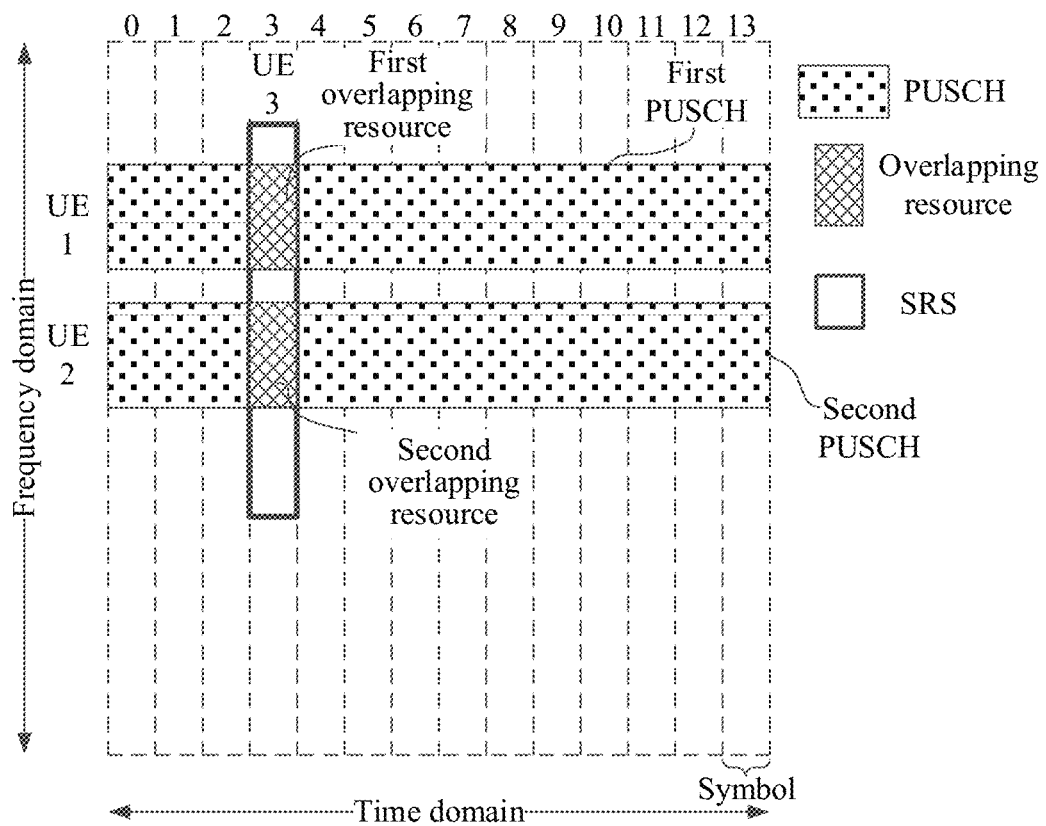
FIG. 13 is a schematic diagram of a time-frequency resource of a physical channel overlapping a time-frequency resource of a first reference signal in a subframe in a single user (SU) scenario according to an embodiment of the present invention.

It should be noted that, when there are a plurality of terminals in a cell, in an SU scenario, frequency domain resources of different terminals are independent of each other. Therefore, the different terminals may independently determine a multiplexing scheme to multiplex the SRS and the PUSCH. Referring to FIG. 13, in a scenario of this embodiment, time-frequency resources of a current subframe are occupied by three terminals (UE 1, UE 2, and UE 3). The UE 1 occupies a time-frequency resource of a first PUSCH to send uplink data, the UE 2 occupies a time-frequency resource of a second PUSCH to send uplink data, and the UE 3 occupies a part of a time-frequency resource of the fourth symbol (numbered 3) to send an SRS. The time-frequency resource of the first PUSCH and the time-frequency resource of the second PUSCH are independent of each other in a frequency division manner, and the time-frequency resource of the first PUSCH and the time-frequency resource of the second PUSCH separately overlap the time-frequency resource of the SRS (e.g., separately having a first overlapping resource and a second overlapping resource). The UE 1 multiplexes the first PUSCH and the SRS based on a multiplexing mode configured by the network device, and the UE 2 multiplexes the second PUSCH and the SRS based on a multiplexing mode configured by the network device.

Figure 14:
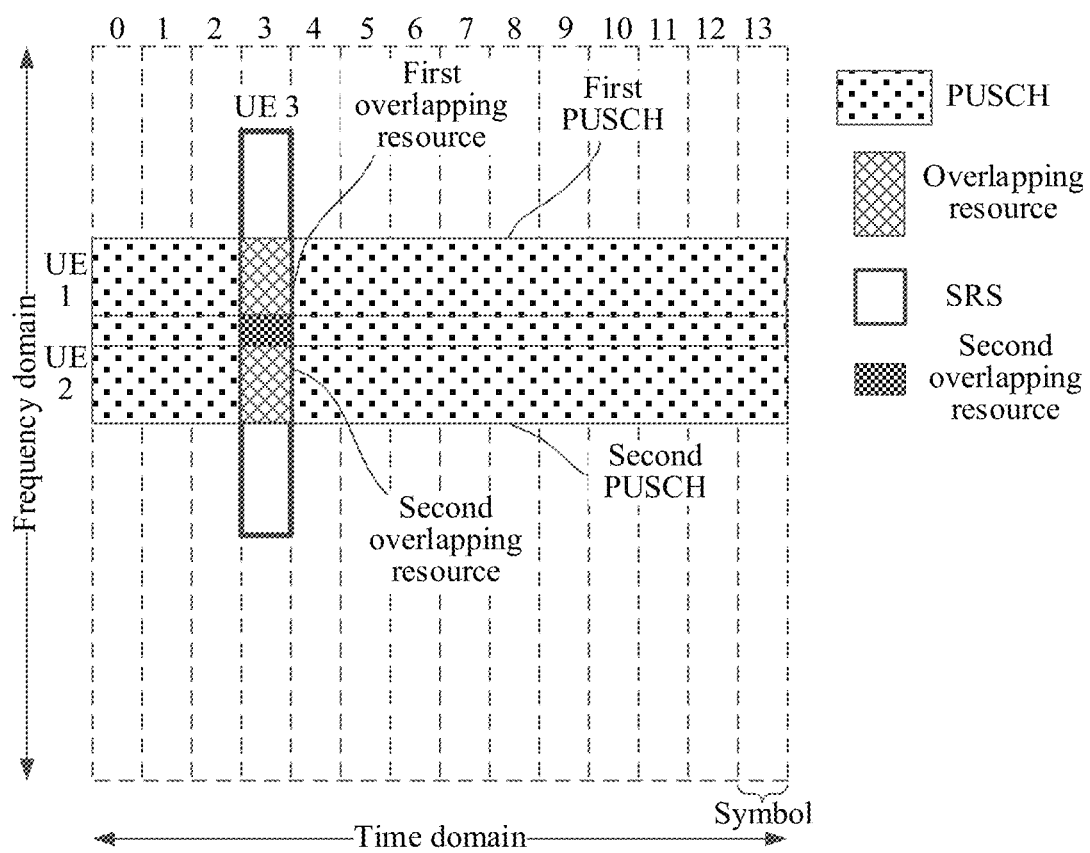
FIG. 14 is a schematic diagram of a time-frequency resource of a physical channel overlapping a time-frequency resource of a first reference signal in a subframe in an MU scenario according to an embodiment of the present invention.

In an MU scenario, frequency domain resources of different terminals are not independent of each other. For example, in an uplink MU-MIMO technology, different terminals may use a same time-frequency resource for uplink transmission. Referring to FIG. 14, in a scenario of this embodiment, time-frequency resources of a current subframe are occupied by three terminals (UE 1, UE 2, and UE 3). The UE 1 occupies a time-frequency resource of a first PUSCH to send uplink data, the UE 2 occupies a time-frequency resource of a second PUSCH to send uplink data, and the UE 3 occupies a part of a time-frequency resource of the fourth symbol (numbered 3) to send an SRS. The time-frequency resource of the first PUSCH and the time-frequency resource of the second PUSCH separately overlap the time-frequency resource of the SRS (e.g., separately having a first overlapping resource and a second overlapping resource). In addition, the time-frequency resource of the first PUSCH also overlaps the time-frequency resource of the second PUSCH. As a result, the first overlapping resource overlaps the second overlapping resource (overlapping on a third overlapping resource). The UE 1 multiplexes the first PUSCH and the SRS based on a multiplexing mode configured by the network device. The UE 2 multiplexes the second PUSCH and the SRS based on a multiplexing mode configured by the network device. It further needs to ensure that reference signals (a block SRS and/or a DMRS) carried on the first overlapping resource and the second overlapping resource do not interfere with each other.

In a specific embodiment of the MU scenario, if the first overlapping resource is used to carry a first block SRS, and the second overlapping resource is used to carry a second block SRS, it needs to ensure that the first block SRS and the second block SRS do not interfere with each other. Specifically, orthogonal resources of the first block SRS and the second block SRS may be configured, so that the first block SRS and the second block SRS may be orthogonal in a frequency domain comb manner, an OCC manner, a block wise manner, or the like, to avoid interference. In addition, the first block SRS and the second block SRS may alternatively be scrambled by using different scrambling codes, to avoid interference.

In a specific embodiment of the MU scenario, if the first overlapping resource is used to carry a first DMRS, and the second overlapping resource is used to carry a second DMRS, it needs to ensure that the first DMRS and the second DMRS do not interfere with each other. Specifically, an orthogonal resource between the first DMRS and the second DMRS may be configured, so that the first DMRS and the second DMRS may be orthogonal in a frequency domain comb manner, an OCC manner, a block wise manner, or the like, to avoid interference. In addition, the first DMRS and the second DMRS may alternatively be scrambled by using different scrambling codes, to avoid interference.

In a specific embodiment of the MU scenario, if the first overlapping resource is used to carry a DMRS, and the second overlapping resource is used to carry a block SRS, it needs to ensure that the DMRS and the block SRS do not interfere with each other. Specifically, an orthogonal resource between the first DMRS and the second DMRS may be configured, so that the first DMRS and the second DMRS may be orthogonal in a frequency domain comb manner, an OCC manner, a block wise manner, or the like, to avoid interference.

The foregoing embodiments describe scenarios of the embodiments in which PUSCH uplink data and the SRS come from different terminals. The following describes a scenario of an embodiment in which PUSCH uplink data and an SRS come from a same terminal.

Figure 15:
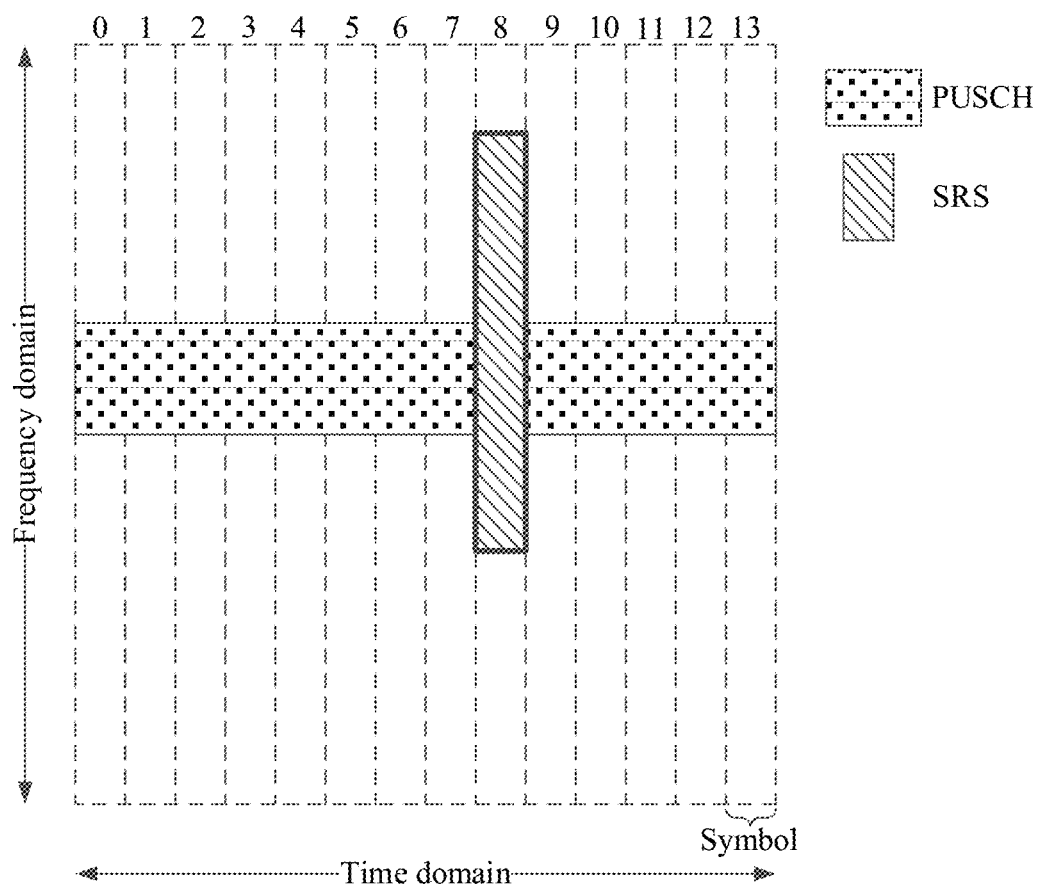
FIG. 15 is a schematic diagram of a scenario of a case in which an SRS is generated by a current terminal according to an embodiment of the present invention.

Referring to FIG. 15, in a scenario of an embodiment shown in FIG. 15, in a current subframe, the terminal needs to send a PUSCH and an SRS. A bandwidth of the PUSCH is narrower than or equal to a bandwidth of the SRS, the bandwidth of the PUSCH is equal to a bandwidth of an overlapping resource, and a configured time-frequency resource of the PUSCH overlaps a time-frequency resource of the SRS. In this case, there may be two implementation forms for multiplexing the PUSCH and the SRS.

In an implementation form 3a, the overlapping resource between the time-frequency resource of the PUSCH and the time-frequency resource of the SRS is located in the ninth symbol. The terminal performs rate matching on the overlapping resource, to enable the overlapping resource to be not used to send the PUSCH. A part of the time-frequency resource of the PUSCH other than the overlapping resource is used to send the PUSCH to the network device. A time-frequency resource corresponding to the ninth symbol is used to send the SRS to the network device.

In an implementation form 3b, the overlapping resource between the time-frequency resource of the PUSCH and the time-frequency resource of the SRS is located in the ninth symbol. The terminal performs rate matching on the overlapping resource, to enable the overlapping resource to be not used to send the PUSCH. The overlapping resource is used to send a DMRS, and the DMRS remains orthogonal to the SRS. A part of the time-frequency resource of the PUSCH other than the overlapping resource is used to send the PUSCH to the network device (including: A time-frequency resource originally carrying the DMRS is used to carry uplink data). A time-frequency resource corresponding to the ninth symbol is used to send the SRS to the network device.

Figure 16:
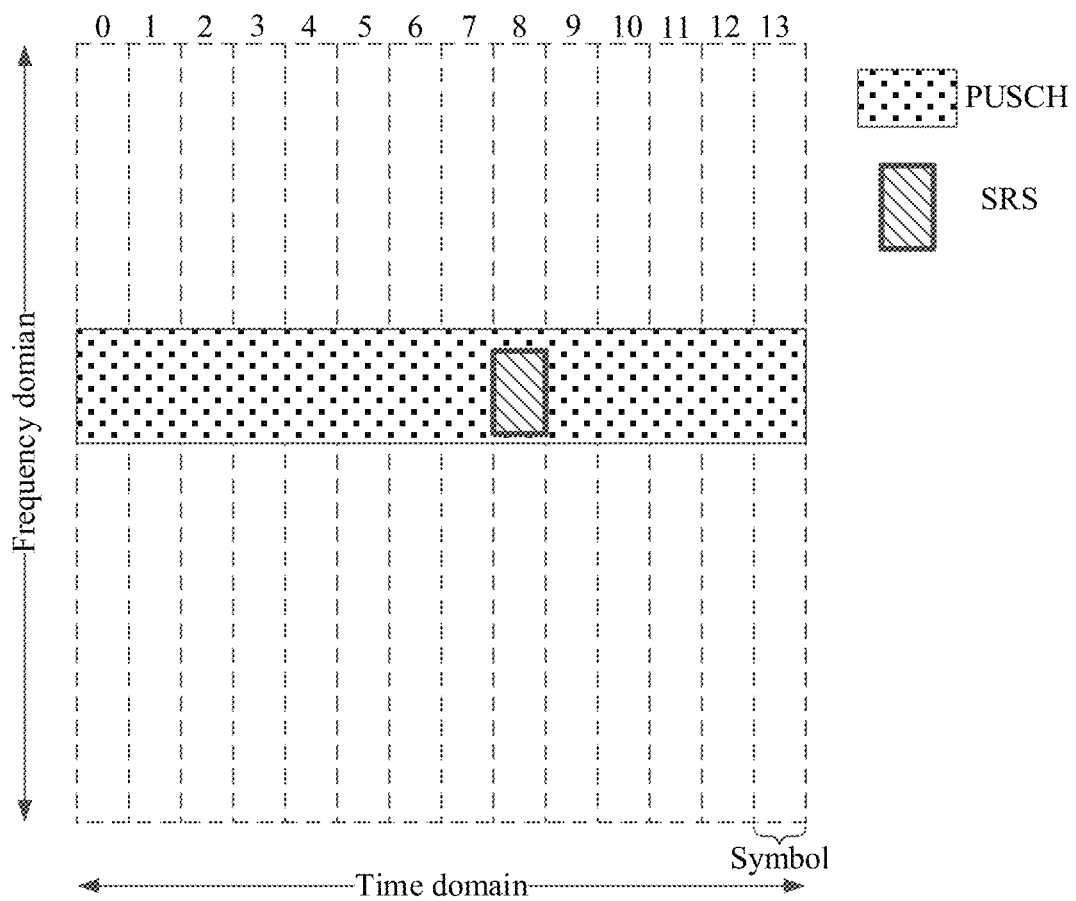
FIG. 16 is a schematic diagram of a scenario of another case in which an SRS is generated by a current terminal according to an embodiment of the present invention.

Referring to FIG. 16, in a scenario of an embodiment shown in FIG. 16, in a current subframe, the terminal needs to send a PUSCH and an SRS, a bandwidth of the PUSCH is wider than a bandwidth of an overlapping resource, and a configured time-frequency resource of the PUSCH overlaps a time-frequency resource of the SRS. In this case, the PUSCH and the SRS may be multiplexed in at least two implementation forms.

In an implementation form 4a, the overlapping resource between the time-frequency resource of the PUSCH and the time-frequency resource of the SRS is located in the ninth symbol. The terminal performs rate matching on the overlapping resource, to enable the overlapping resource to be not used to send the PUSCH. A part of the time-frequency resource of the PUSCH other than the overlapping resource is used to send the PUSCH to the network device. In addition, the terminal may set different power offsets for a transmit power of the ninth symbol and a transmit power of other symbols, and perform power boosting on uplink data carried in a part in an overlapping region other than the overlapping resource in the ninth symbol. In this way, the ninth symbol has the transmit power equivalent to the transmit power of other symbols. The overlapping resource corresponding to the ninth symbol is used to send the SRS to the network device.

In an implementation form 4b, an overlapping region between the time-frequency resource of the PUSCH and the time-frequency resource of the SRS is located in the ninth symbol. The terminal performs rate matching on the overlapping region, to enable the overlapping region to be not used to send the PUSCH. The overlapping region is used to send a DMRS, and the DMRS remains orthogonal to the SRS. A part of the time-frequency resource of the PUSCH other than the overlapping region is used to send the PUSCH to the network device (including: A time-frequency resource originally carrying the DMRS is used to carry uplink data). The overlapping resource corresponding to the ninth symbol is used to send the SRS to the network device.

It can be learned that, during implementation of the embodiments of the present invention, the SRS may be sent in any symbol in a subframe, and one subframe may include SRSs of a plurality of terminals in a cell. When a terminal sends the PUSCH, if the time-frequency resource of the PUSCH overlaps the time-frequency resource of the SRS in the current subframe, the terminal may multiplex the PUSCH and the SRS in one symbol, or may multiplex the PUSCH and the SRS in one time-frequency resource (including one RB or a plurality of RBs). The terminal may alternatively send the block SRS or DMRS of the terminal by using the overlapping resource or the overlapping region. Implementation of the embodiments of the present invention helps improve a sending speed of the sounding reference signal, reduce resource overheads, keep power spectral density balance, and ensure stability of an uplink throughput in communication transmission after an SRS capacity is enhanced.

Figure 17:
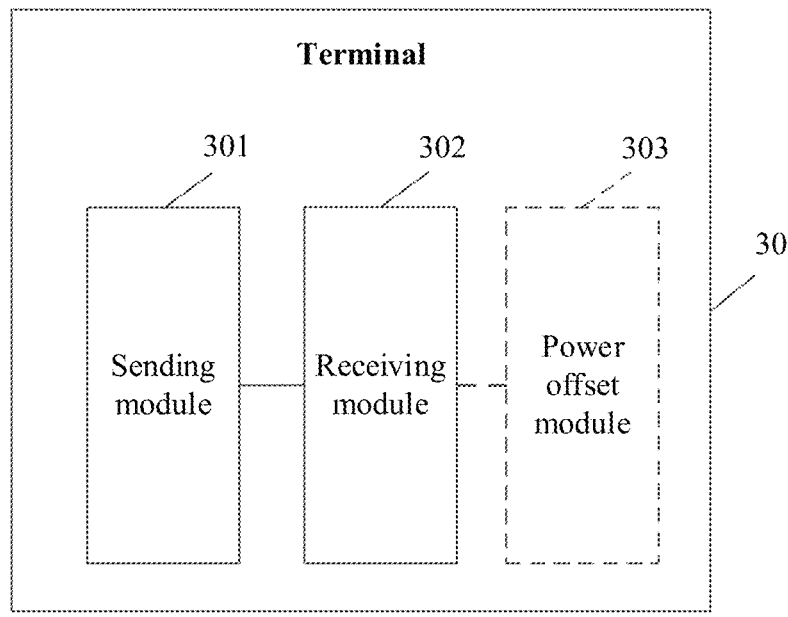
FIG. 17 is a schematic structural diagram of a terminal according to an embodiment of the present invention.

Based on a same inventive concept, an embodiment of the present invention provides a terminal 30. Referring to FIG. 17, the terminal 30 includes a sending module 301 and a receiving module 302.

The receiving module 302 is configured to receive resource location information that is sent by a network device and that is of a first reference signal and a physical channel.

The first reference signal is mapped on a first time-frequency resource, the first time-frequency resource partially or totally overlaps a second time-frequency resource corresponding to the physical channel, and a time-frequency resource corresponding to a part that is in the second time-frequency resource and that overlaps the first time-frequency resource is an overlapping resource; and the terminal skips sending the first reference signal; and the overlapping resource is not used to transmit the physical channel, the sending module 301 is configured to send the physical channel to the network device on a third time-frequency resource, and the third time-frequency resource is a resource in the second time-frequency resource other than the overlapping resource; or the overlapping resource is used to send a second reference signal, and a third time-frequency resource in the second time-frequency resource other than the overlapping resource is used to transmit the physical channel; and the sending module 301 is configured to send the second reference signal on the overlapping resource, and the sending module 301 is further configured to send the physical channel on the third time-frequency resource; or a second time-frequency resource corresponding to a symbol in which the overlapping resource is located is an overlapping region, the overlapping region is used to send a second reference signal, and a fourth time-frequency resource in the second time-frequency resource other than the overlapping region is used to transmit the physical channel; the sending module 301 is configured to send the second reference signal in the overlapping region, and the sending module 301 is further configured to send the physical channel on the fourth time-frequency resource; and the symbol is a DFT-S-OFDM symbol, an OFDM symbol, or a CP-OFDM symbol, where the first reference signal is used to sound uplink channel quality, the second reference signal is orthogonal to the first reference signal, and the first reference signal is an SRS generated by another terminal, or the first reference signal is an SRS generated by the terminal.

Specifically, the physical channel is an uplink data bearer channel, and the physical channel is used to carry uplink data.

Optionally, the terminal further includes a power offset module 303. When a bandwidth of the overlapping resource is narrower than a bandwidth of the physical channel, the power offset module 303 is configured to set different power offsets for the physical channel of a symbol where the overlapping resource is located and the physical channel of a remaining symbol, the remaining symbol is a symbol in symbols corresponding to the second time-frequency resource other than the symbol in which the overlapping resource is located.

In a specific embodiment, the second reference signal is used to sound uplink channel quality of the terminal. Specifically, the second reference signal is an SRS of the terminal.

In a specific embodiment, the second reference signal is used to demodulate a signal of the terminal, and the second reference signal is preset at a preset location in the second time-frequency resource. A time-frequency resource corresponding to the preset location in the second time-frequency resource is used to transmit the physical channel. Specifically, the second reference signal is a DMRS of the terminal.

In a specific embodiment, orthogonality of overlapping parts between the second reference signal and the first reference signal is implemented through cyclic shift, and a time-frequency resource corresponding to the overlapping part is the overlapping resource.

Optionally, when the first reference signal is generated by the terminal, the first reference signal is used to sound uplink channel quality of the terminal. In this case, the sending module 301 is further configured to send the first reference signal to the network device on the first time-frequency resource.

Optionally, the resource location information includes RRC layer signaling or physical layer signaling.

It should be noted that according to detailed descriptions of the embodiments of FIG. 4 and FIG. 5, a person skilled in the art may clearly know an implementation method of each function module included in the terminal 30. Therefore, for brevity of the specification, details are not described herein again.

Figure 18:
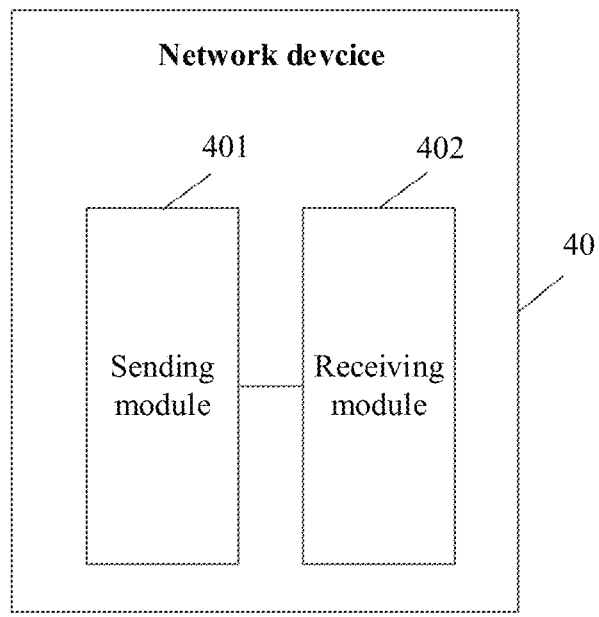
FIG. 18 is a schematic structural diagram of a network device according to an embodiment of the present invention.

Based on a same inventive concept, an embodiment of the present invention provides a network device 40. Referring to FIG. 18, the network device 40 includes a sending module 401 and a receiving module 402.

The sending module 401 sends resource location information of a first reference signal and a physical channel to a terminal.

The first reference signal is mapped on a first time-frequency resource, the first time-frequency resource partially or totally overlaps a second time-frequency resource corresponding to the physical channel, and a time-frequency resource corresponding to a part that is in the second time-frequency resource and that overlaps the first time-frequency resource is an overlapping resource; and the terminal skips sending the first reference signal; and the overlapping resource is not used to transmit the physical channel, and a third time-frequency resource in the second time-frequency resource other than the overlapping resource is used to transmit the physical channel; or the overlapping resource is used to send a second reference signal, and a third time-frequency resource in the second time-frequency resource other than the overlapping resource is used to transmit the physical channel; or a second time-frequency resource corresponding to a symbol in which the overlapping resource is located is an overlapping region, the overlapping region is used to send a second reference signal, and a fourth time-frequency resource in the second time-frequency resource other than the overlapping region is used to transmit the physical channel; and the symbol is a DFT-S-OFDM symbol, an OFDM symbol, or a CP-OFDM symbol, where the first reference signal is used to sound uplink channel quality, and the second reference signal is orthogonal to the first reference signal.

The receiving module 402 is configured to receive the physical channel sent by the terminal; and the receiving module is further configured to receive the second reference signal sent by the terminal.

Specifically, the physical channel is an uplink data bearer channel, and the physical channel is used to carry uplink data.

In a specific embodiment, the second reference signal is used to sound uplink channel quality of the terminal. Specifically, the second reference signal is an SRS of the terminal.

In another specific embodiment, the second reference signal is used to demodulate a signal of the terminal, and the second reference signal is preset at a preset location in the second time-frequency resource. A time-frequency resource corresponding to the preset location in the second time-frequency resource is used to transmit the physical channel. Specifically, the second reference signal is a DMRS of the terminal.

In a specific embodiment, orthogonality of overlapping parts between the second reference signal and the first reference signal is implemented through cyclic shift, and a time-frequency resource corresponding to the overlapping part is the overlapping resource.

Optionally, when the first reference signal is generated by the terminal, the first reference signal is used to sound uplink channel quality of the terminal.

Optionally, the resource location information includes RRC layer signaling or physical layer signaling.

It should be noted that according to detailed descriptions of the embodiments of FIG. 4 and FIG. 5, a person skilled in the art may clearly know an implementation method of each function module included in the network device 40. Therefore, for brevity of the specification, details are not described herein again.

Figure 19:
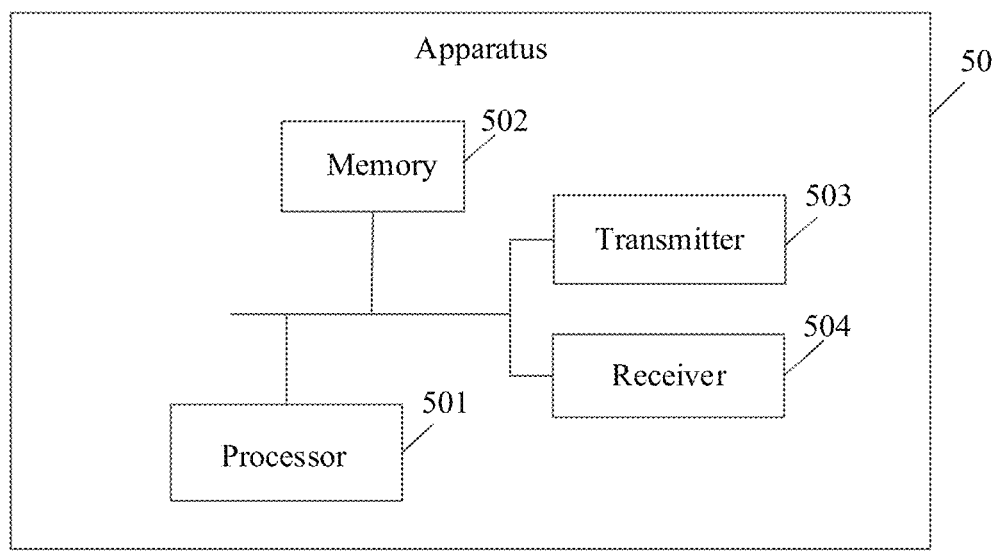
FIG. 19 is a schematic structural diagram of an apparatus according to an embodiment of the present invention.

Based on a same inventive concept, an embodiment of the present invention further provides an apparatus 50. Referring to FIG. 19, the apparatus 50 may be configured to implement the data sending method described in the foregoing embodiment of FIG. 4 or FIG. 5. As shown in FIG. 19, the apparatus 50 includes a transmitter 503, a receiver 504, a memory 502, and a processor 501 coupled to the memory 502 (there may be one or more processors 501, and an example in which there is one processor is used in FIG. 19). The transmitter 503, the receiver 504, the memory 502, and the processor 501 may perform communication connection. The transmitter 503 is configured to send data to the outside, and the receiver 504 is configured to receive data from the outside. The memory 502 is configured to store program code, and the processor 501 is configured to invoke and run the program code stored in the memory 502.

When the apparatus 50 is a terminal, the program code stored in the memory 502 is specifically used to implement the function of the terminal in the method embodiment of FIG. 4 or FIG. 5. Specifically, the processor 501 is configured to invoke the program code stored in the memory 502 and perform the following step: receiving, by the processor, resource location information that is sent by a network device and that is of a first reference signal and a physical channel.

The first reference signal is mapped on a first time-frequency resource, the first time-frequency resource partially or totally overlaps a second time-frequency resource corresponding to the physical channel, and a time-frequency resource corresponding to a part that is in the second time-frequency resource and that overlaps the first time-frequency resource is an overlapping resource; and the terminal skips sending the first reference signal; and the overlapping resource is not used to transmit the physical channel, and a third time-frequency resource in the second time-frequency resource other than the overlapping resource is used to transmit the physical channel; and the processor sends the physical channel to the network device on the third time-frequency resource by using the transmitter; or the overlapping resource is used to send a second reference signal, and a third time-frequency resource in the second time-frequency resource other than the overlapping resource is used to transmit the physical channel; and the processor sends the second reference signal on the overlapping resource by using the transmitter, and sends the physical channel on the third time-frequency resource by using the transmitter; or a second time-frequency resource corresponding to a symbol in which the overlapping resource is located is an overlapping region, the overlapping region is used to send a second reference signal, and a fourth time-frequency resource in the second time-frequency resource other than the overlapping region is used to transmit the physical channel; the processor sends the second reference signal in the overlapping region by using the transmitter, and sends the physical channel on the fourth time-frequency resource by using the transmitter; and the symbol is a DFT-S-OFDM symbol, an OFDM symbol, or a CP-OFDM symbol, where the first reference signal is used to sound uplink channel quality, and the second reference signal is orthogonal to the first reference signal.

It should be noted that when the apparatus 50 is a terminal, for steps performed by the processor 501 and other technical features related to the processor 501, reference may be made to related content of the terminal in the method embodiment of FIG. 4 or FIG. 5, and details are not described herein again.

When the apparatus 50 is a network device, the program code stored in the memory 502 is specifically used to implement the function of the network device in the method embodiment of FIG. 4 or FIG. 5. Specifically, the processor 501 is configured to invoke the program code stored in the memory 502 and perform the following steps: sending, by the processor, resource location information of a first reference signal and a physical channel to a terminal by using the transmitter, where the first reference signal is mapped on a first time-frequency resource, the first time-frequency resource partially or totally overlaps a second time-frequency resource corresponding to the physical channel, and a time-frequency resource corresponding to a part that is in the second time-frequency resource and that overlaps the first time-frequency resource is an overlapping resource; and the terminal skips sending the first reference signal; and the overlapping resource is not used to transmit the physical channel, and a third time-frequency resource in the second time-frequency resource other than the overlapping resource is used to transmit the physical channel; or the overlapping resource is used to send a second reference signal, and a third time-frequency resource in the second time-frequency resource other than the overlapping resource is used to transmit the physical channel; or a second time-frequency resource corresponding to a symbol in which the overlapping resource is located is an overlapping region, the overlapping region is used to send a second reference signal, and a fourth time-frequency resource in the second time-frequency resource other than the overlapping region is used to transmit the physical channel; and the symbol is a DFT-S-OFDM symbol, an OFDM symbol, or a CP-OFDM symbol, where the first reference signal is used to sound uplink channel quality, and the second reference signal is orthogonal to the first reference signal; and receiving, by the processor by using the receiver, the physical channel sent by the terminal; and receiving, by the processor by using the receiver, the second reference signal sent by the terminal.

It should be noted that when the apparatus 50 is a network device, for steps performed by the processor 501 and other technical features related to the processor 501, reference may be made to related content of the network device in the method embodiment of FIG. 4 or FIG. 5, and details are not described herein again.

In addition, an embodiment of the present invention further provides a communications system, and the communications system includes a terminal and a network device. The terminal and the network device respectively correspond to the terminal and the network device in the method embodiment of FIG. 4 or FIG. 5.

During specific implementation, the terminal may be the terminal shown in FIG. 17, and the network device may be the network device shown in FIG. 18.

During specific implementation, the terminal may be terminal represented by the apparatus shown in FIG. 19, and the network device may be the network device represented by the apparatus shown in FIG. 19.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions, and when the computer program instructions are loaded and executed on a computer, all or some of the procedures or functions according to the embodiments of the present invention are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (e.g., a coaxial cable, an optical fiber, or a digital subscriber line) or wireless (e.g., infrared, radio, and microwave, or the like) manner. The computer-readable storage medium may be any usable medium accessible by a computer, or a data storage device, such as a server or a data center, integrating one or more usable media. The usable medium may be a magnetic medium (e.g., a floppy disk, a hard disk, a magnetic tape, or the like), an optical medium (e.g., a DVD or the like), a semiconductor medium (e.g., a solid-state drive), or the like.

In the foregoing embodiments, the description of each embodiment has respective focuses. For a part that is not described in detail in an embodiment, refer to related descriptions in other embodiments.

What is claimed is:

1. A data sending method carried out by a terminal on an overlapping resource, the method comprising:
receiving a resource location information sent by a network device and that is of a first reference signal and a physical channel,
wherein:
the first reference signal is mapped on a first time-frequency resource, the first time-frequency resource overlaps a second time-frequency resource corresponding to the physical channel, and a time-frequency resource corresponding to a part that is in the second time-frequency resource and that overlaps the first time-frequency resource is the overlapping resource; and in accordance with the overlapping resource:
the terminal skips sending the first reference signal; and
the overlapping resource is not used to transmit the physical channel, the terminal sends the physical channel to the network device on a third time-frequency resource, and the third time-frequency resource is a resource in the second time-frequency resource other than the overlapping resource;
or
the terminal uses the overlapping resource to send a second reference signal; and
the terminal sends the second reference signal on the overlapping resource, and sends the physical channel on the third time-frequency resource;
or
a second time-frequency resource corresponding to a symbol in which the overlapping resource is located is an overlapping region, the terminal uses the overlapping region to send a second reference signal, and the terminal uses a fourth time-frequency resource in the second time-frequency resource other than the overlapping region to transmit the physical channel;
sending the second reference signal in the overlapping region, and sending the physical channel on the fourth time-frequency resource;
wherein the symbol is a discrete Fourier transform-spread orthogonal frequency division multiplexing (DFT-S-OFDM) symbol or an orthogonal frequency division multiplexing (OFDM) symbol, and
wherein the second reference signal is orthogonal to the first reference signal.

2. The method according to claim 1, wherein a bandwidth of the overlapping resource is narrower than a bandwidth of the physical channel, and
wherein the method, in accordance with the bandwidth of the overlapping resource being narrower than the bandwidth of the physical channel, comprises:
setting different power offsets for a physical channel of the symbol in which the overlapping resource is located and a physical channel of a remaining symbol,
wherein the remaining symbol is a symbol in symbols corresponding to the second time-frequency resource other than the symbol in which the overlapping resource is located.

3. The method according to claim 1, wherein the second reference signal is a sounding reference signal of the terminal.

4. The method according to claim 1, wherein:
the second reference signal is a demodulation reference signal of the terminal, and
the second reference signal is preset at a preset location in the second time-frequency resource.

5. The method according to claim 4, wherein a time-frequency resource corresponding to the preset location in the second time-frequency resource is used to transmit the physical channel.

6. The method according to claim 1, wherein that the second reference signal is orthogonal to the first reference signal comprises:
overlapping parts between the second reference signal and the first reference signal implement orthogonality through cyclic shift, and
a time-frequency resource corresponding to the overlapping part is the overlapping resource.

7. A communication apparatus, comprising a receiver and a transmitter, wherein:
the receiver is configured to receive resource location information that is sent by a network device and that is of a first reference signal and a physical channel, wherein:
the first reference signal is mapped on a first time-frequency resource, the first time-frequency resource overlaps a second time-frequency resource corresponding to the physical channel, and a time-frequency resource corresponding to a part that is in the second time-frequency resource and that overlaps the first time-frequency resource is an overlapping resource; and in accordance with the overlapping resource:
the terminal skips sending the first reference signal; and
the overlapping resource is not used to transmit the physical channel, the transmitter is configured to send the physical channel to the network device on a third time-frequency resource, and the third time-frequency resource is a resource in the second time-frequency resource other than the overlapping resource; or the overlapping resource is used to send a second reference signal; and the transmitter is configured to send the second reference signal on the overlapping resource, and send the physical channel on the third time-frequency resource; or a second time-frequency resource corresponding to a symbol in which the overlapping resource is located is an overlapping region, the overlapping region is used to send a second reference signal, and a fourth time-frequency resource in the second time-frequency resource other than the overlapping region is used to transmit the physical channel;

the transmitter is configured to send the second reference signal in the overlapping region, and the transmitter is further configured to send the physical channel on the fourth time-frequency resource; and the symbol is a discrete Fourier transform-spread orthogonal frequency division multiplexing (DFT-S-OFDM) symbol or an orthogonal frequency division multiplexing (OFDM) symbol, wherein the second reference signal is orthogonal to the first reference signal.

8. The apparatus according to claim 7, wherein the terminal further comprises a processor, wherein a bandwidth of the overlapping resource is narrower than a bandwidth of the physical channel, and wherein, in accordance with the bandwidth of the overlapping resource being narrower than the bandwidth of the physical channel, the processor sets different power offsets for a physical channel of the symbol in which the overlapping resource is located and a physical channel of a remaining symbol, and wherein the remaining symbol is a symbol in symbols corresponding to the second time-frequency resource other than the symbol in which the overlapping resource is located.

9. The apparatus according to claim 7, wherein the second reference signal is a sounding reference signal of the terminal.

10. The terminal according to claim 7, wherein the second reference signal is a demodulation reference signal of the terminal, and the second reference signal is preset at a preset location in the second time-frequency resource.

11. The terminal according to claim 10, wherein a time-frequency resource corresponding to the preset location in the second time-frequency resource is used to transmit the physical channel.

12. The terminal according to claim 7, wherein that the second reference signal is orthogonal to the first reference signal comprises:

overlapping parts between the second reference signal and the first reference signal implement orthogonality through cyclic shift, and a time-frequency resource corresponding to the overlapping part is the overlapping resource.

13. A network device, comprising a transmitter and a receiver, wherein the transmitter sends resource location information of a first reference signal and a physical channel to a terminal, wherein the first reference signal is mapped on a first time-frequency resource, the first time-frequency resource overlaps a second time-frequency resource corresponding to the physical channel, and a time-frequency resource corresponding to a part that is in the second time-frequency resource and that overlaps the first time-frequency resource is an overlapping resource; and in accordance with the overlapping resource:

the terminal skips sending the first reference signal; and the overlapping resource is not used to transmit the physical channel, a third time-frequency resource is used to send the physical channel to the network device, and the third time-frequency resource is a resource in the second time-frequency resource other than the overlapping resource; or the overlapping resource is used to send a second reference signal; and the third time-frequency resource is used to send the physical channel; or a second time-frequency resource corresponding to a symbol in which the overlapping resource is located is an overlapping region, the overlapping region is used to send a second reference signal, and a fourth time-frequency resource in the second time-frequency resource other than the overlapping region is used to transmit the physical channel; and the symbol is a discrete Fourier transform-spread orthogonal frequency division multiplexing (DFT-S-OFDM) symbol or an orthogonal frequency division multiplexing (OFDM) symbol, wherein the second reference signal is orthogonal to the first reference signal; and wherein the receiver is configured to receive the physical channel sent by the terminal; and the receiver is further configured to receive the second reference signal sent by the terminal.

14. The network device according to claim 13, wherein the second reference signal is a sounding reference signal of the terminal.

15. The network device according to claim 13, wherein the second reference signal is a demodulation reference signal of the terminal, and the second reference signal is preset at a preset location in the second time-frequency resource.

16. The network device according to claim 15, wherein a time-frequency resource corresponding to the preset location in the second time-frequency resource is used to transmit the physical channel.

17. The network device according to claim 13, wherein that the second reference signal is orthogonal to the first reference signal comprises:

overlapping parts between the second reference signal and the first reference signal implement orthogonality through cyclic shift, and a time-frequency resource corresponding to the overlapping part is the overlapping resource.

* * * * *